United States Patent [19]

Swanson et al.

[11] Patent Number: 6,122,601
[45] Date of Patent: Sep. 19, 2000

[54] COMPACTED MATERIAL DENSITY MEASUREMENT AND COMPACTION TRACKING SYSTEM

[75] Inventors: David C. Swanson; H. Randolph Thomas, both of State College; Amr A. Oloufa, Newport, all of Pa.

[73] Assignee: The Penn State Research Foundation, University Park, Pa.

[21] Appl. No.: 09/027,233

[22] Filed: Feb. 20, 1998

Related U.S. Application Data

[63] Continuation-in-part of application No. 08/833,011, Mar. 27, 1997, which is a continuation-in-part of application No. 60/014,412, Mar. 29, 1996.
[60] Provisional application No. 60/038,894, Feb. 20, 1997.
[51] Int. Cl.[7] ..................................................... A01B 29/00
[52] U.S. Cl. .............................................. 702/137; 702/33
[58] Field of Search ............................. 701/50, 200, 208, 701/213, 300; 172/2, 7; 37/348; 340/988, 990, 995; 364/151; 702/33–56, 85, 94, 95, 137–141, 150, 179–181, 191

[56] References Cited

U.S. PATENT DOCUMENTS

| | | | |
|---|---|---|---|
| 3,797,954 | 3/1974 | Harris | 404/117 |
| 4,103,554 | 8/1978 | Thurner | 73/573 |
| 4,330,738 | 5/1982 | Paramythioti et al. | 318/128 |
| 5,177,415 | 1/1993 | Quibel et al. | 318/128 |
| 5,471,391 | 11/1995 | Gudat et al. | 701/50 |
| 5,493,494 | 2/1996 | Henderson | 701/50 |
| 5,646,844 | 7/1997 | Gudat et al. | 701/208 |
| 5,826,666 | 10/1998 | Tozawa et al. | 172/7 |
| 5,848,485 | 12/1998 | Anderson et al. | 37/348 |

OTHER PUBLICATIONS

Oloufa et al., Integrated GIS for Contruction Site Investigation pp. 211–222 Journal of Construction Eng & Management vol. 120 #1, Mar. 1994.

GeoDynamik Compaction Documentation System Brochure Unattributed, 1987.

Hughes, C. S., ",", Compaction of Asphalt Pavement, Transportation Research Board, National Research. Council (Washington, DC), pp. 11–23, (Jan. 31, 1989).

Kilpatrick, M. J., ",", Bituminous Pavement Construction, Federal Highway Administration (Washington, DC), pp. 1–42, (Jun. 30, 1967).

Pagdadis, S. A., "Design of Reail Time Site Operations Control for In–Place Asphalt Pavement Recycling," Transportation Research Record #1465, Polytechnic University, Dept of Civil and Environmental Eng. (Brooklyn, NY), pp. 31–38, ( Jan. 31, 1994).

Kemp, G. R., "A Comparison of Field and Laboratory Environments on Asphalt Durability," Proceedings of the Association of Asphalt Paving Technologies, Association of Asphalt Paving Technologists, pp. 492–537, ( Jan. 31, 1881).

Geodynamik Compaction Documentation System; GEODYN Inc.; Sweden 1995 pp. 1–9.

*Primary Examiner*—Marc S. Hoff
*Assistant Examiner*—Craig Steven Miller
*Attorney, Agent, or Firm*—Thomas J. Monahan

[57] ABSTRACT

The present invention provides a two component system to obtain uniform density of compacted materials and track the compaction of the materials. The first component provides an automated, real-time compaction density meter and method of use to measure the density of the compacted material. The second component provides a Geographic Information System (GIS) for tracking compaction of a surface at specific locations. The two components of the present invention combined provide a system to measure the density of the compacted material and record the location of each density measurement. The components of the present invention can be utilized for many compaction operations, such as the roller compaction of concrete, pavement, soil, landfills, and asphalt pavements.

23 Claims, 25 Drawing Sheets

VARIATION IN COMPACTION ROLLER PASSES IN 20 TEST SECTIONS
(KILPATRIC AND MCQUATE, 1967)

WHERE L : COMPACTOR WHEELBASE

L1 : HORIZONTAL DISTANCE FROM COMPACTOR FRONT EDGE TO POSITIONING SENSOR LOCATION

W : DRUM WIDTH

W1 : VERTICAL DISTANCE FROM COMPACTOR DRUM SIDE TO POSITIONING SENSOR LOCATION

● : FRONT EDGE POSITION

: BASIC COMPACTOR DIMENSIONS AND POSITIONING SENSOR LOCATION

⇒ : MOVING PATH

⊘ : POSITIONING SENSOR LOCATION

● : FRONT EDGE POSITION

SHADED AREA : COMPACTED AIR

: COMPACTED AREA DURING A CONSECUTIVE TIME PERIOD

WHERE ($T_1, X_1, Y_1$) : POSITIONING SENSOR LOCATION AT TIME 1

($T_1, X_{11}, Y_{11}$) : LEFT FRONT EDGE LOCATION OF COMPACTOR AT TIME 1

($T_1, X_{12}, Y_{12}$) : RIGHT FRONT EDGE LOCATION OF COMPACTOR AT TIME 1

($T_2, X_2, Y_2$) : POSITIONING SENSOR LOCATION AT TIME 2

($T_2, X_{21}, Y_{21}$) : LEFT FRONT EDGE LOCATION OF COMPACTOR AT TIME 2

($T_2, X_{22}, Y_{22}$) : RIGHT FRONT EDGE LOCATION OF COMPACTOR AT TIME 2

⟹ : COMPACTOR MOVING DIRECTION

POLYGON WITHOUT TERMINATING

POLYGON TERMINATED INTO TWO POLYGONS

COMPACTOR MAKING A TURN GREATER THAN OR EQUAL TO 90°

COMPACTOR CHANGING DIRECTION SIGNIFICANTLY

TOPOLOGICAL OVERLAY JOINING POLYGONS OF SOIL TYPES AND PARCELS

INTERSECTION AND UNION AREAS BY USING OVERLAY TECHNIQUE

COMPACTED MATERIAL DENSITY MEASUREMENT AND COMPACTION TRACKING SYSTEM

This application is a Continuation In Part of U.S. patent application Ser. No. 08/833,011 filed Mar. 27, 1997 now pending and claims priority to U.S. Provisional Application No. 60/038,894 filed Feb. 20, 1997 now expired, Ser. No. 60/014,412, filed Mar. 29, 1996.

BACKGROUND OF THE INVENTION

Compaction of a construction material is recognized as being important for improving the stability of the material in construction operations such as soils and asphalt pavement. By compacting the surface, soil strength and stability can be increased to the magnitude required by the design.

State Highway Agencies and contractors are concerned about quality control when working with pavements. For asphalt pavements, performance and quality are affected by two primary factors: a properly designed mix and adequate compaction. These two factors must be performed together to assure quality. Therefore, compaction of asphalt is considered to be important in the performance of the asphalt as pavement.

Compaction involves the packing and orientation of solid particles into a more dense and effective particle arrangement for reducing the air voids content of asphalt pavement or other materials between solid particles. When working with a road, the layers of a road are constituted with pavement, base and subgrade from top to bottom. The pavement is made of an asphalt mixture. The base is a layer of stone fragments, slag, or soil-aggregate mixtures. The subgrade is constructed with soils having a specified grading.

The purposes of compacting pavement are multifold. Compaction may be used to prevent further significant densification under traffic, provide adequate shear strength, and ensure that the asphalt mixture is essentially waterproof. The stability of the pavement will likely be low if the pavement is not sufficiently compacted. If the traffic exceeds the shear strength of the asphalt mixture, it may cause early failure. Further, the compaction of an asphalt mixture protects the underlying pavement layers from the adverse effects of water. Low shear strength and stability, poor resistance to deformation and skid, and moisture damage usually arise when compaction is inadequate.

Oxidation on the asphalt binder results in the pavement becoming brittle, potentially resulting in cracking and raveling of the asphalt pavement. Test results have shown that the amount of voids in asphalt pavement has an effect on the rate of hardening of the asphalt binder. (Kemp, G. R. and N. H., Predoehl. "A comparison of Field and Laboratory Environments on Asphalt Durability", Proceedings of the Association of Asphalt Paving Technologies, Vol. 50, pp. 492–537, 1981.)

Pavement distress may occur because of loss in the subgrade supporting capacity during the frost-melt period. (Yoder, E. J. and M. W. Witczak. Principles of Pavement Design, New York, N.Y., John Wiley & Sons, Inc. pp. 627–645, 1975.) The distress may exist for long periods of time after the melting has occurred. Loss of strength is apparent in areas where alternate freeze and thawing takes place throughout the winter months. Each time the pavement freezes, a loss of pavement density results. After several cycles of freezing and thawing, a large part of the subgrade supporting capacity may be lost.

There are numerous factors that effect the compaction of the subgrade support, for example, working temperature, material properties, including asphalt, aggregate grading, as well as design mix. Compaction is also affected by construction equipment and factors such as compactor speed, roller frequency, amplitude, wheel load, as well as the number of passes. The roller frequency is a vibratory system inside the roller that applies force to compact the pavement mat. The normal amplitude is the difference in height of the action of the wheel impact between the lowest and highest points.

When the pavement is undercompacted, the pavement lacks sufficient strength to bear traffic load and thus the pavement can be easily destroyed. Other problems may be caused by undercompacting including poor resistance to moisture and deformations. Conversely, overcompaction may cause pavement bleeding when the climate changes and the asphalt is too soft for the temperature.

This will cause skidding problems by vehicles and may be a traffic hazard or may cause a drop off on the road shoulder which may render the road unsafe. Overcompaction may lead to the breaking of the asphalt pavement aggregate, thus disturbing the desired grading of asphalt mixture, since coarse and fine aggregates are important in achieving the desired density. According to Hughes, C. S. Compaction of Asphalt Pavement. Washington, D.C.: Transportation Research Board, National Research Council, Vol. 152, pp. 11–22, 1989, particle shape, angularity, absorption and surface texture are also important properties of the aggregate.

There are many processes involved in the compaction process. In compaction operations, there are pavers, asphalt trucks, and compactors used in the production process. This equipment must perform together. Pavers and asphalt trucks go before the compactor. The distance between paving trains and compactors is about 15–100 m (estimated). This distance depends on the weather conditions and asphalt mixture property. Compactors must pass the spreading asphalt mixture during a certain time limit in order to attain the maximum density. This limitation also involves temperature of asphalt mixture, asphalt mixture properties, and field test results.

Before the project starts, paving contractors prepare a "test strip" where a short road is constructed. Results from this test strip supplies the contractor with the number of compactor passes that are needed to attain the required asphalt density and strength.

Normally, the rolling operation starts on the low side of the spread, which is usually the outside of the lane, and progresses toward the high side. (Asphalt Paving Manual. 2nd ed. College Park: MD, The Asphalt Institute, pp. 125–137, 1965). When asphalt mixtures are still hot, they tend to move towards the low side of the spread under the action of the roller. If the rolling is started on the high side, this movement is more pronounced than if the rolling progresses from the low side. A pattern of rolling that will provide the most uniform coverage of the lane being paved should be used.

Quality control is an important concern of State Highway Agencies. The quality of asphalt pavement is affected by two primary factors: a properly designed mix and compaction. To ensure that the asphalt pavement will sustain the various loads imposed on it, the density of the asphalt pavement is measured. There are two basic specifications for pavement compaction: method specification, and end result specification (Hughes, C. S. Compaction of Asphalt Pavement. Washington, D.C.; Transportation Research Board, National Research Counsel, Vol. 152, pp. 11–22, 1989):

Method Specification: The contractor is required to follow step-by-step procedures using specified equipment and the required number of passes of the rollers. A disadvantage of method specification is that this specification does not allow contractors to use the most economical procedures to construct the project. Another disadvantage is that the compaction process requires continuous and full-time monitoring to assure that the specified rolling is completed within the time and temperature limitations.

End Result Specification: In this specification, the responsibility for the control of the process is assigned to the contractor. The limits for this specification are usually derived intuitively from what the specification writer feels is achievable or are based on statistically derived amount estimates.

There are two general classes of field density measurements, destructive and nondestructive measurements, (Pagdadis, S. A. and Ishai, L: "Design of Real-Time Site Operations Control for In-Place Asphaly Pavement Recycling". Transportation Research Record #1465, pp. 31–38, 1994) that test whether the desired pavement density is achieved. For destructive measurements, a pavement core sample first must be retrieved from the field and then the saturated surface-dry (SSD) or a paraffin-coated specimen method is used in the test. This method is time consuming and, for this reason, this method is normally used for inspection only rather than quality control. For nondestructive measurements, nuclear gauges are used to control the pavement density. Gauges also provide contractors with density information while the asphalt is still hot enough to compact. However, often times measurements are inaccurate.

According to test results, when other conditions are the same, density of asphalt pavement will increase with the increase in number of passes. As the number of passes remains the best indicator of pavement density, new techniques for better accuracy and efficiency in monitoring the compaction process are needed. The exact number of roller passes over each pavement is desired in order to accomplish the uniformity of the density so that statistical type-specifications are met.

However, the number of coverages made by the compactors is difficult to monitor in the compacting process. FIG. 14 shows the results of observations made at 20 locations in a 2-mile stretch of pavement that was rolled with a 12-ton three-wheel roller in the compaction position (Kilpatrick, M. D. and McQuate, R. G., Bituminous Pavement Construction. Washington, D.C.; Federal Highway Administration, 1967). FIG. 14 shows that two areas in a pavement, the joint and edge, tend to receive less compaction than the rest of the cross section.

As previously mentioned, since a variation in the number of passes will lead to undercompaction, overcompaction, or both, therefore, a system is needed to help the contractors attain a correct and inform number of passes.

A CDS (Compaction Documentation System) was developed in the mid-'80s in Sweden (The Geodynamik Compaction Documentation System. Sweden: GEODYN, Inc., 1995). This CDS provides a conceptual system to monitor the compaction process. In this system, the operator enters the compaction data manually when he operates the compactor. All records, including lane change, direction change, number of passes, layer number, and start or stop to operate must be entered by hand. Moreover, there was no sensor to identify the orientation and position of moving compaction equipment, so operators must follow the moving path that was decided previously.

The technology of automated real-time positioning has improved tremendously in the last few years. Currently, there are two main modes for positioning, laser and GPS. Laser positioning is extremely accurate (<10 cm), however, it is limited by the need to place multiple laser targets that act as receivers. GPS is a satellite based technology. It is relatively inexpensive however accuracy is typically 3–5 in, which is insufficient for this research. Through the use of differential GPS, the accuracy is improved to <1 m which is still unacceptable. However, with the application of software corrections, GPS differential measurements can have an accuracy of <10 cm.

It is an object of the present invention to provide a real-time compaction density meter.

It is another object of the present invention to provide a method of real-time measurement of density of a compacted material.

It is another object of the present invention to provide a geographic information system for tracking compaction of materials.

SUMMARY OF THE INVENTION

The present invention provides a compaction density meter; a method of determining the density of a compacted material during compaction of the material; and a system to record density and position of a compacted material. The density meter includes a measuring device which generates signals representing a vibratory response produced by vibration in the equipment which is compacting the material. The density meter also includes a computer which transforms the signals into density data of the compacted material.

The method of determining the density of a compacted material during compaction includes four main steps. Step 1 is the inputting of characteristic parameters of compaction equipment and materials to be compacted. The second step is inputting vibratory response data of the compaction equipment, site conditions and density measurements of the material to be compacted which are measured during compaction test strips of the material. The third step is developing equations from the data from steps one and two in order to define the vibratory response-density relationship for the compaction of the material. The fourth step includes inputting the vibratory response data into the developed equations of the third step to determine the density of the compacted material.

The recording of the density and position includes the density meter and method described above along with a means for determining a position of the recorded density value. This is performed by operatively monitoring the geographical position of the compactor and transmitting the geographical position to a computer for receiving the geographical position. Also, included is a means for computing, storing, transmitting and displaying the geographical position wherein the compaction of the surface is tracked on the basis of the position and number of coverages or passes over the compacted material.

DETAILED DESCRIPTION OF THE PREFERRED EMBODIMENTS

There is a need for uniform density in pavement, particularly asphalt pavement used for roadway surfaces. The present invention provides a two component system to obtain uniform density of compacted materials and track the compaction of the materials. The first component provides an automated, real-time compaction density meter and method of use to measure the density of the compacted material. The second component provides a Geographic Information System (GIS) for tracking compaction of a surface at specific locations. The two components of the present invention combined provide a system to measure the density of the compacted material and record the location of each density measurement.

The components of the present invention can be utilized for many compaction operations, such as the roller compaction of concrete, pavement, soil, landfills, and asphalt pavements. The present invention will be primarily described as utilized in conjunction with asphalt pavement systems and this is no way intended to limit the invention. The references listed herein are incorporated by reference and are intended to be utilized in accordance with the present invention.

The first component provides an automated, real-time compaction density meter mounted on vibratory asphalt compaction equipment. The compaction meter estimates the density of an asphalt pavement during the compaction of the asphalt. Measurements taken during compaction allow for corrective action to be taken during the compaction progress. The basis and the method of use of the compaction meter takes in account the vibratory response of the compaction equipment. The vibratory response of the equipment correlates to the density of the asphalt being compacted.

Figure 1:
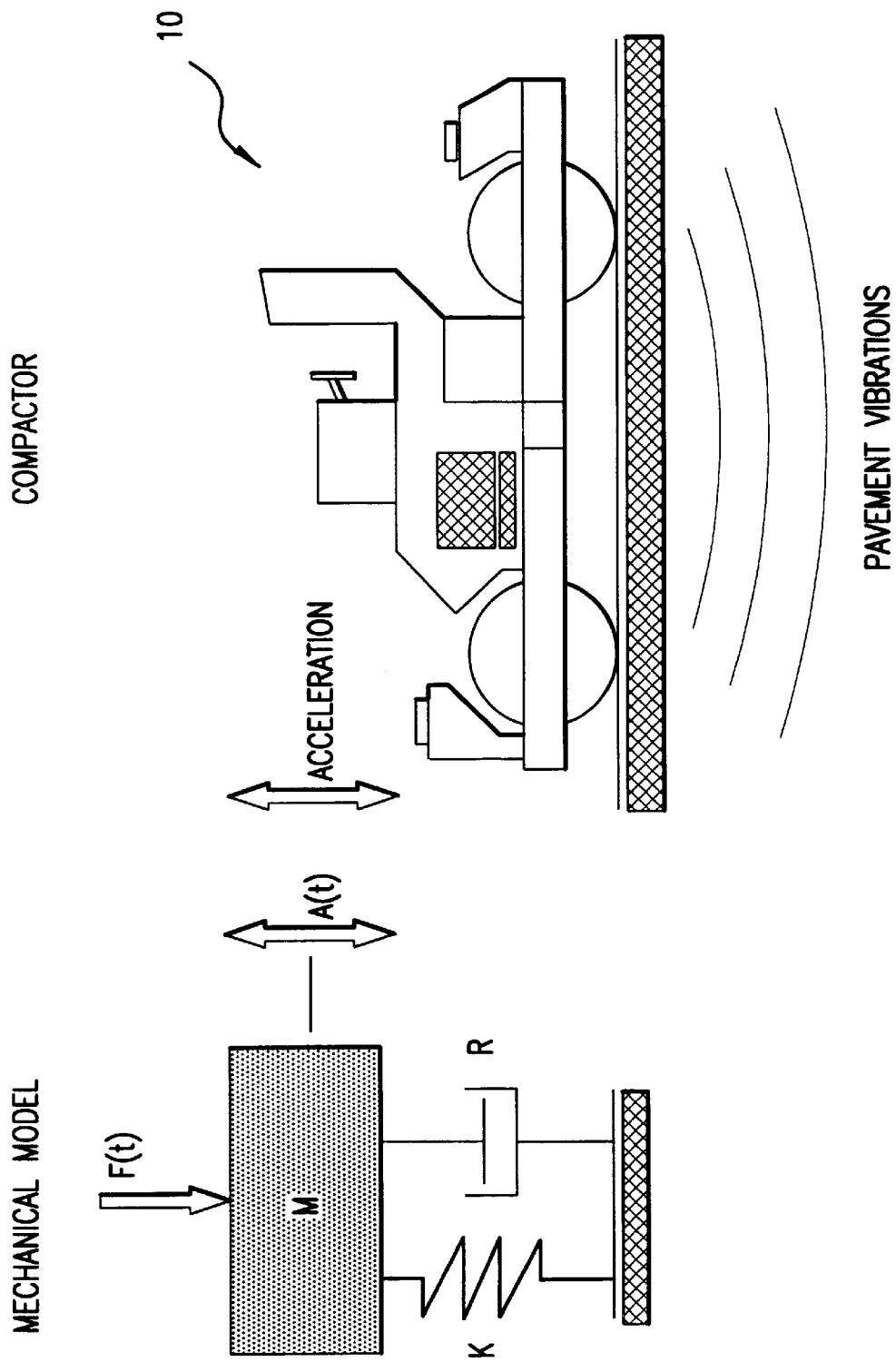
FIG. 1 is a theoretical model of vibratory response according to the present invention.

A vibratory compactor has intrinsic vibrations from its engine, propulsion system, and the vibratory mechanism in the compactor's drums which vibrate the compactor as it moves. These vibrations make up the vibratory response of the compactor. The assertion that asphalt density is related to the vibratory response of the compaction equipment is based the mechanical model of FIG. 1. The theory of the automated compaction meter is that as the asphalt mat becomes more dense, the vibratory response of the compactor increases. As shown in FIG. 1, the vibratory response of the compactor 10 is a function of the spring stiffness, k, which is related to the density of the pavement. As the density of the pavement increases, so does the spring stiffness, k. As k increases, there is a corresponding increase in the vibratory response of the compactor 10. Once the vibratory response of a compactor 10 is correlated to asphalt density through the developed equations, the density of the pavement can be estimated by measuring the vibratory acceleration of the compactor 10.

The mass of a compactor, M influences the vibration forces f(t) of the compactor 10 as shown in FIG. 1. For a single compactor model, the mass remains nearly constant throughout its use. Therefore, the mass of the compactor is treated as a constant value. Equipment speed also influences f(t), but the pavement compaction operation is typically done at approximately the same speed and does not influence changes in f(t). Thus, because vibration forces f(t) remain constant, the mass and speed can be ignored during the vibratory response analysis of the compactor. The acceleration a(t) of the compactor vibrations depends on the ground stiffness k and the damping R. At low frequencies the stiffness k is the dominant physical factor affecting a(t), and the damping R is negligible enough to be ignored. Thus, the acceleration a(t) is proportional to the stiffness k of the material being compacted, as f(t) and M are constant, and R is negligible. This is show mathematically in the following equation.

$$\text{Acceleration } a(t) \approx \text{Stiffness } k \quad (1)$$

As the materials beneath the compactor become more dense, the reduction of air voids adds structure to the material. This results in higher densities and greater overall pavement stiffness measured in weight per unit volume. This relationship is expressed as following equation.

$$\text{Stiffness } k \approx \text{Density or Compaction} \quad (2)$$

Therefore, it follows from equation (1) and (2) that:

$$\text{Acceleration } a(t) \approx \text{Density or Compaction} \quad (3)$$

The increased stiffness excites the specific excitation vibrations already being produced by the compactor. As the equipment moves over compacted material, the vibration forces result in higher measured acceleration amplitudes at the fundamental and harmonic frequencies as compared to the amplitudes measured when the equipment passes over softer material. Thus, based on the simplistic model of FIG. 1, the following reactions have been observed in field evaluations on asphalt pavement mats: the harmonic structure of the vibratory response changes in the frequency domain of the equipment; as the asphalt stiffens, the amplitude of the vibratory acceleration a(t) of the equipment increases; and increases in vibratory acceleration a(t) of the equipment are proportional to increases in density of the compacted material.

To develop a method and means to measure the density of the compacted material, various test strips were identified on different asphalt paving projects. A model DD-90 asphalt compactor manufactured by Ingersoll-Rand was used on all of the test strips. The DD-90 was instrumented with three different piezoelectric accelerometers to measure the vibratory response of the compactor. The sensitivity ranges of the three piezoelectric accelerometers were: +/−1 g; +/−500 g; and +/−50 g. The vibratory responses from these accelerometers were recorded on magnetic tape using a DAT recorder. The sites examined and pavement parameters for each site are listed below in Table 1.

Figure 2:
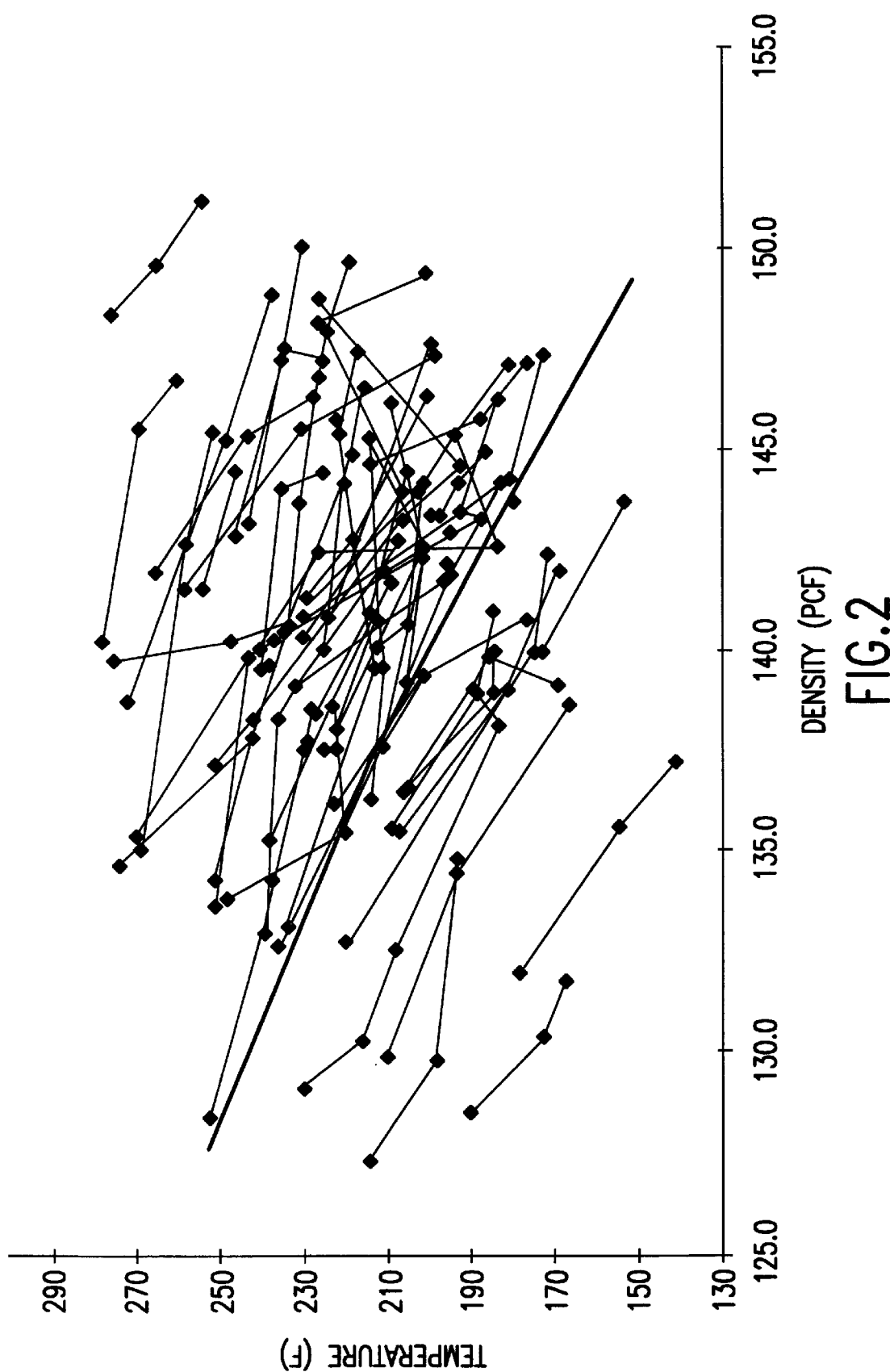
FIG. 2 is a density vs. temperature plot according to the present invention.

Typical temperature data plotted against the estimated density indicated that the values generally fell into a consistent band as shown in FIG. 2. The vibration data recorded from all the sites was analyzed in the laboratory using MATLAB/SIGLAB which is a standard signal processing software package. The parameters used for this analysis are a band width of 2 Khz; a Frequency resolution (bin size) of 1.25; FAT size of 4,096; where it was averaged over 4 seconds at a sample rate of 5,120 Hz. The analysis was done in several steps as described below.

The first step was data screening, where the data from all the sites of Table 1 was screened for anomalies, as follows. All data where there were difficulties with the data acquisition equipment were identified and deleted from the analysis. This included the wrong accelerometer, loose connections, and weak batteries. Next, unique construction problems that may have been identified that were associated with the contractor's operation of the equipment were deleted. Among the data deleted were test strips where the contractor alternated the frequency of the compactor's vibratory mechanism between 2,500 rpms and 1,800 rpms. Only data where the frequency of the vibratory mechanism was set at 2,500 rpms was used for the analysis. The process of data screening left results from the sites of PA 61 and PA 11 & 15 for analysis. The database consists of 10 data points

TABLE 1

| Site Location | Number of Test Strips | Number of Passes per Strip | Accelerometer Sensitivity | Location of Accelerometer Relative to Shock Absorber |
|---|---|---|---|---|
| Troy, AL | 1 | 3 | ±1 g | outside the shock absorber |
| Albany, GA | 3 | 3–4 | ±1 g | outside the shock absorber |
| Greer, SC | 3 | 3 | ±1 g | outside the shock absorber |
| Parker Road, GA | 3 | 3 | ±1 g | outside the shock absorber |
| Jones Gap, SC | 6 | 3 | ±1 g | outside the shock absorber |
| Maggie Valley, NC | 3 | 3 | ±1 g | outside the shock absorber |
| Marion, NC | 3 | 3 | ±1 g | outside the shock absorber |
| Sylva, NC | 3 | 3 | ±1 g | outside the shock absorber |
| Hickory, NC | 3 | 3 | ±1 g | outside the shock absorber |
| Back Mountain Rd, Potter Twsp, PA | 4 | 3 | ±500 g | inside the shock absorber |
| US 322, Quentin, PA | 4 | 3 | ±500 g | inside the shock absorber |
| SR 222, Quarryville, PA | 4 | 3 | | |
| US 11 & 15 (1) | 4 | 5 | ±50 g | inside and outside |
| US 11 & 15 (2) | 3 | 5 | ±50 g | inside and outside |
| PA 61, Sunbury, PA | 3 | 4 | ±50 g | inside the shock absorber |

At each project site listed in Table 1, multiple test strips in different locations were monitored, each representing the same site conditions, mix design, and compaction equipment. Test strips were generally 50 to 200 yards apart. Within each test strip, a predetermined location on the asphalt mat was identified, and the point in time when the compactor passed this location was noted on the DAT recorder for later reference. After each pass by the compactor, the mat surface temperature and the density were recorded at predetermined locations. The mat density was measured using a Troxler nuclear density gauge. Thus, the data for each pass and each strip included the vibratory response, mat density, and temperature at a specific point on the pavement, as well as other pertinent information such as equipment settings and asphalt parameters.

The data from the first nine sites of Table 1 was used to gain insight into the characteristics of the vibratory response and its relationship to relative density and actual field conditions. It was found that for the particular compactor that the ±1 g accelerometer was as not effect as the ±50 g and 500 g accelerometers. An important observation was that the mat temperature was sometimes in the range of 150–200° F.

from each of the two project sites. It is these data points that were used for the remaining analyses.

Figure 3:
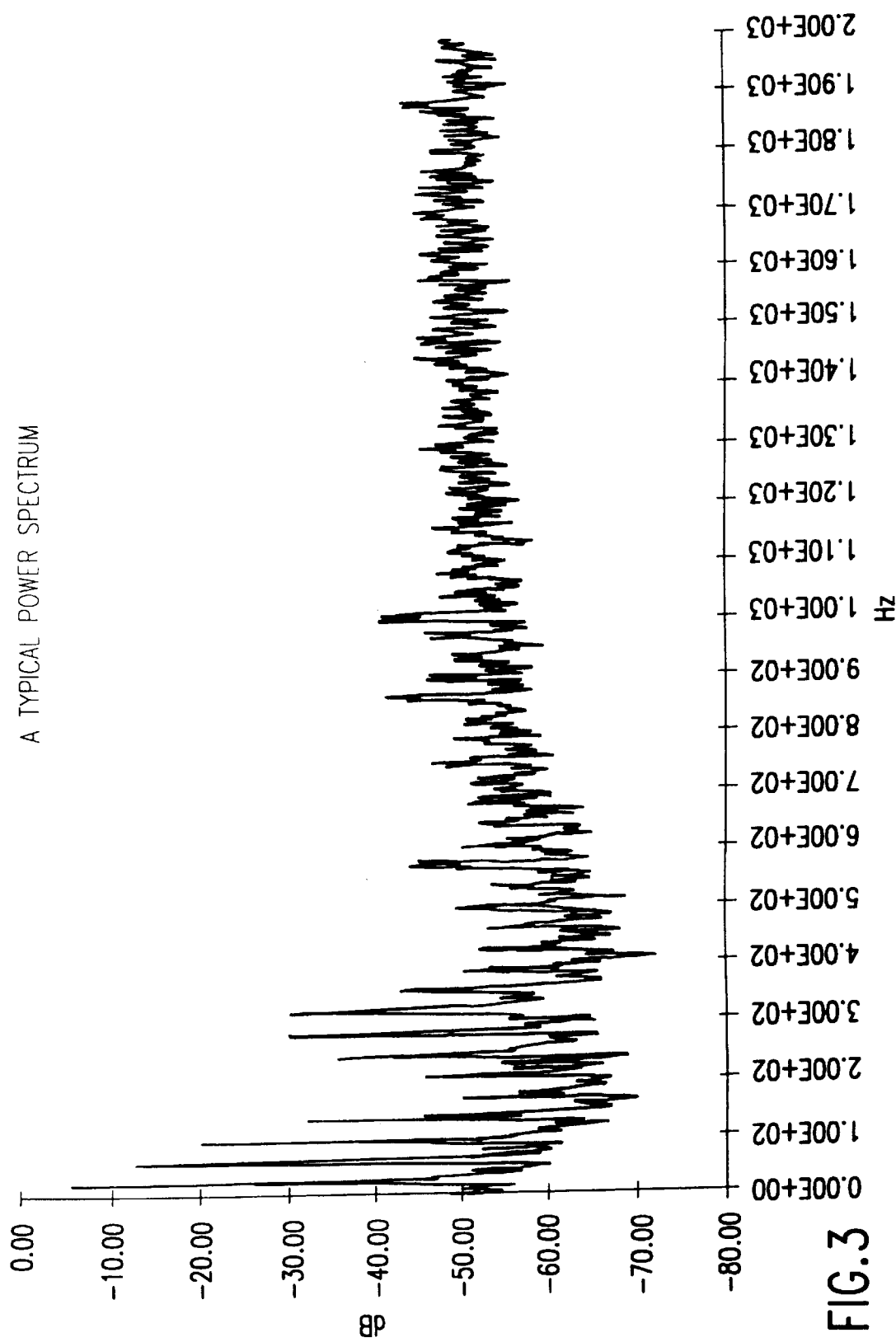
FIG. 3 is a power spectrum plot according to the present invention.

The next step was to analyze the amplitude of fundamental and 2nd through the 4th harmonic frequencies of the compaction equipment. Time domain data was converted to frequency domain data using a Fast Fourier Transformation algorithm, which is part of the MATLAB/SIGLAB software. For all tests, the vibration frequency setting of the vibratory mechanism found in the drums of the DD-90 was set at 2,500 rpms. Dividing the 2,500 rpms setting by 60 seconds yields the actual fundamental frequency of 41.67 Hz. The various harmonic frequencies are multiples of the fundamental frequency. FIG. 3 shows a typical power spectrum, where the fundamental and harmonics can be clearly seen. Prior to analyzing the frequency peaks, it is necessary to describe the pavement and base type of each site. At the first site of PA 61, a rigid base was used having a pavement mix type of "Marshall" and a thickness of one-a-half inches (1 ½"). At the second site of PA 11 & 15, a flexible base was used having a pavement mix type of "Superpave" and a thickness of five inches (5"). Next the frequency peaks are analyzed as amplitude or acceleration at the designated frequency measured in decibels (dBs).

Figure 4:
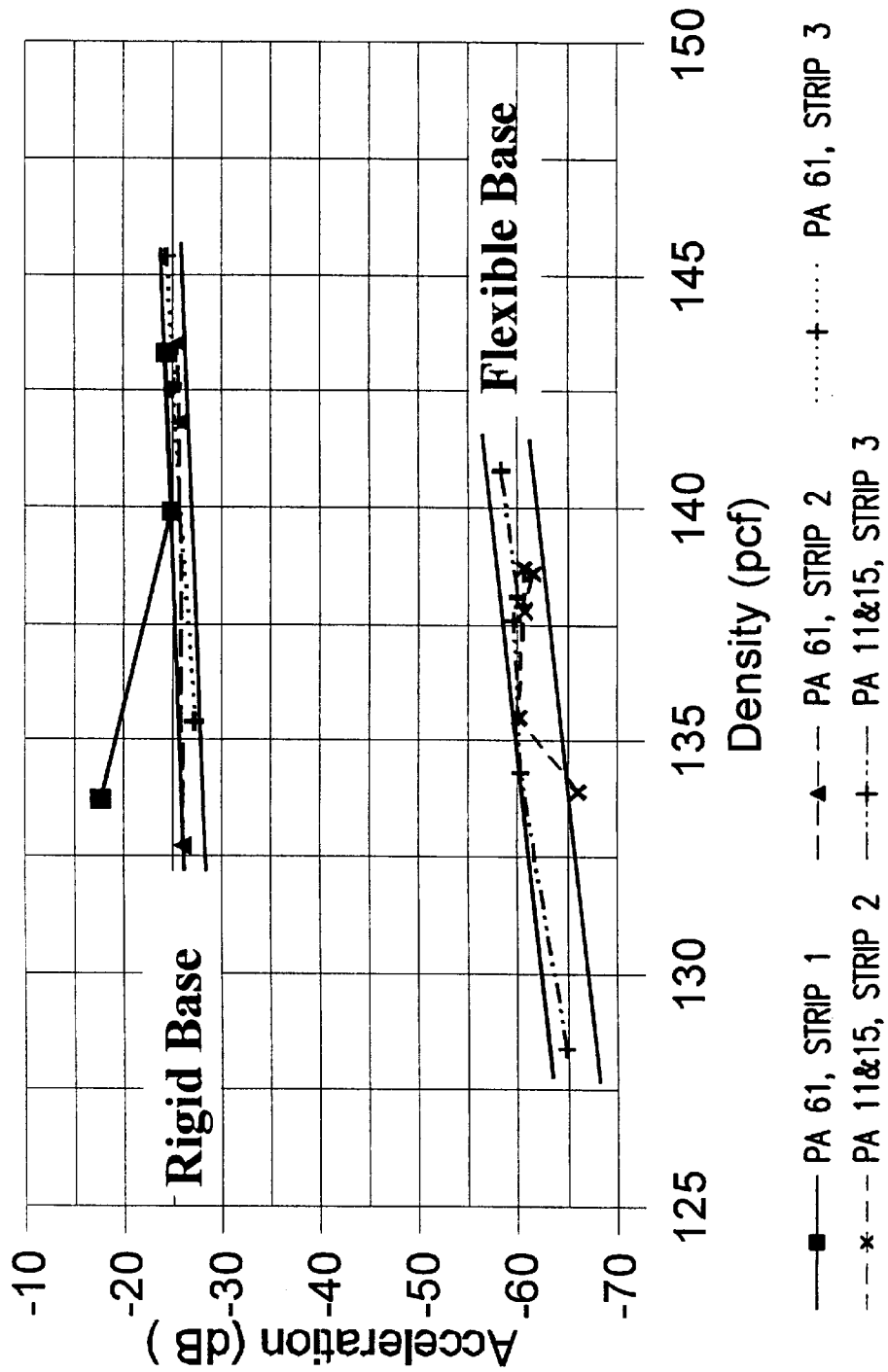
FIG. 4 is an acceleration vs. density plot for a fundamental frequency according to the present invention.
Figure 5:
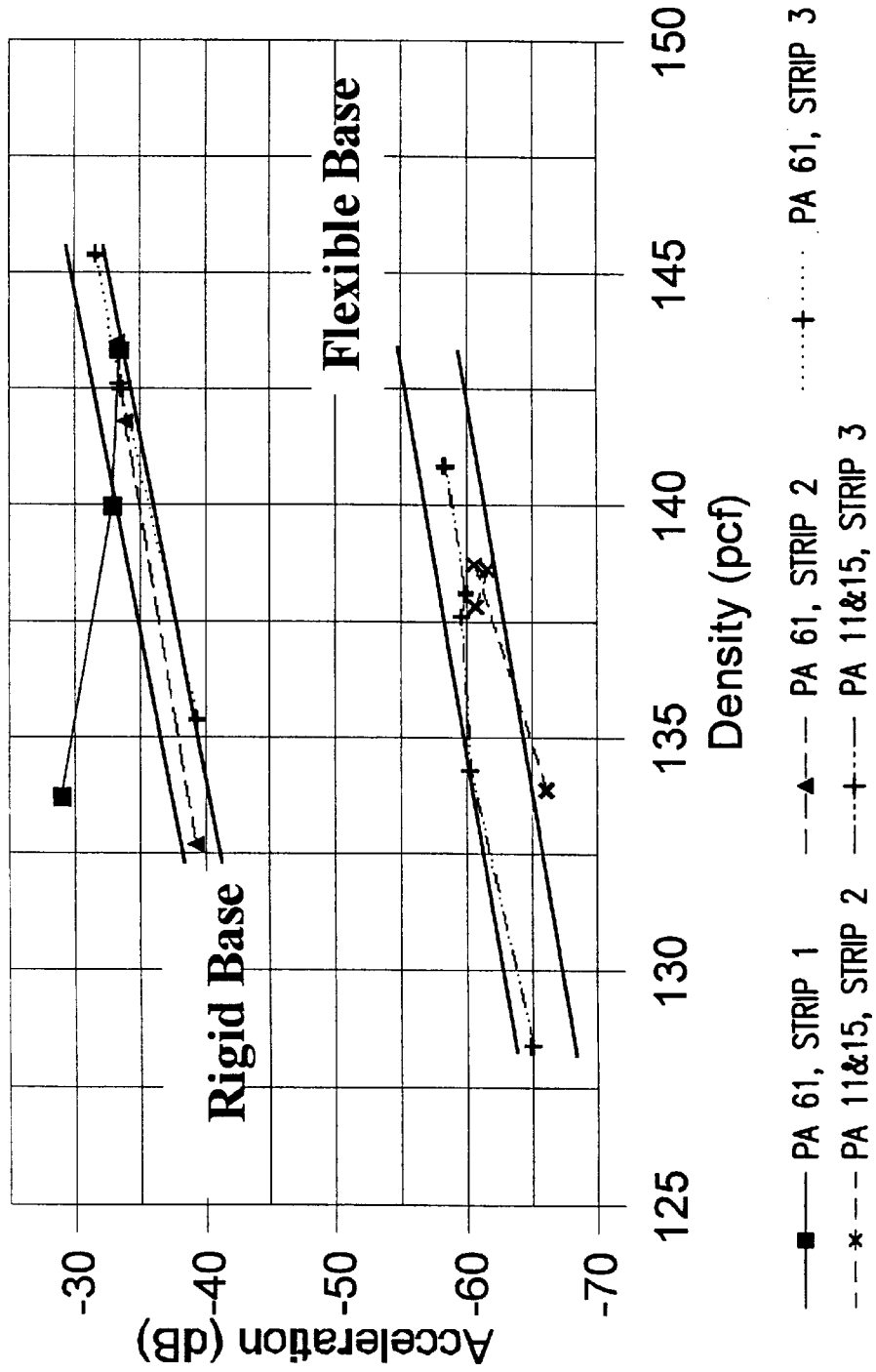
FIG. 5 is an acceleration vs. density plot for a $2^{nd}$ harmonic frequency according to the present invention.
Figure 6:
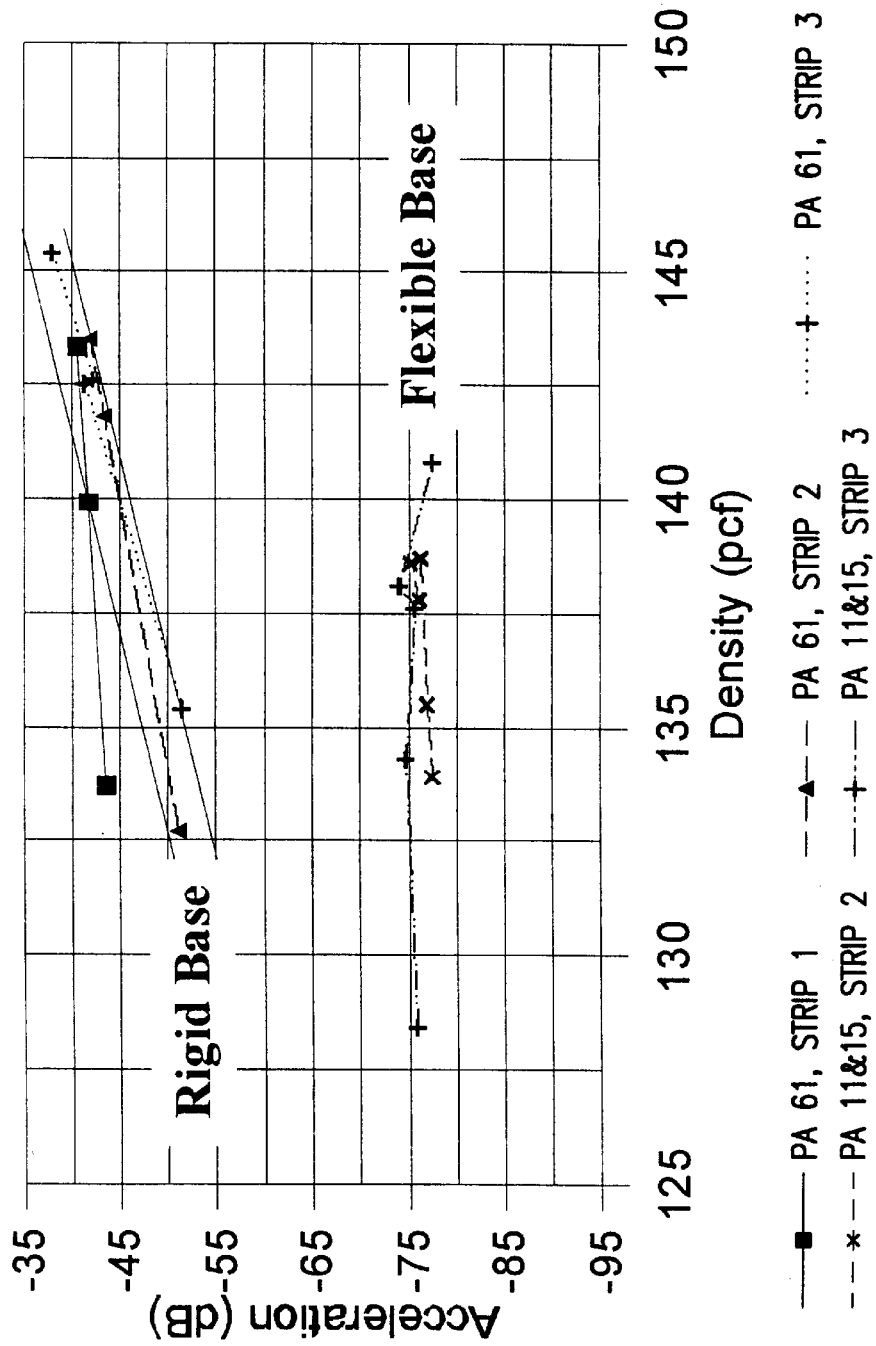
FIG. 6 is an acceleration vs. density plot for a $3^{rd}$ harmonic frequency according to the present invention.

As shown in FIG. 4, there is approximately a 2 dB change in a(t) for each 10 pcf increase in density for the rigid base pavement at the fundamental frequency. This value is about 4 dBs for the flexible base project. FIG. 5 shows for the 2nd harmonic frequency, there is approximately a 6 dB increase for each 10 pcf increase for both data groups. The significance of the increases is somewhat masked by the fact that the dBs are measured in logarithms (base 10). For the 3rd harmonic, there is a difference between the two data groups, as shown in FIG. 6. For the rigid base project, there is approximately a 11 dB increase for each 10 pcf increase. For the flexible base project there is only an increase of approximately 1 dB. The increases in dBs with increasing density are relatively consistent as can be seen from the data. For the data shown in FIGS. 4–6, the band width is on the order of 6–7 pcf.

Figure 7:
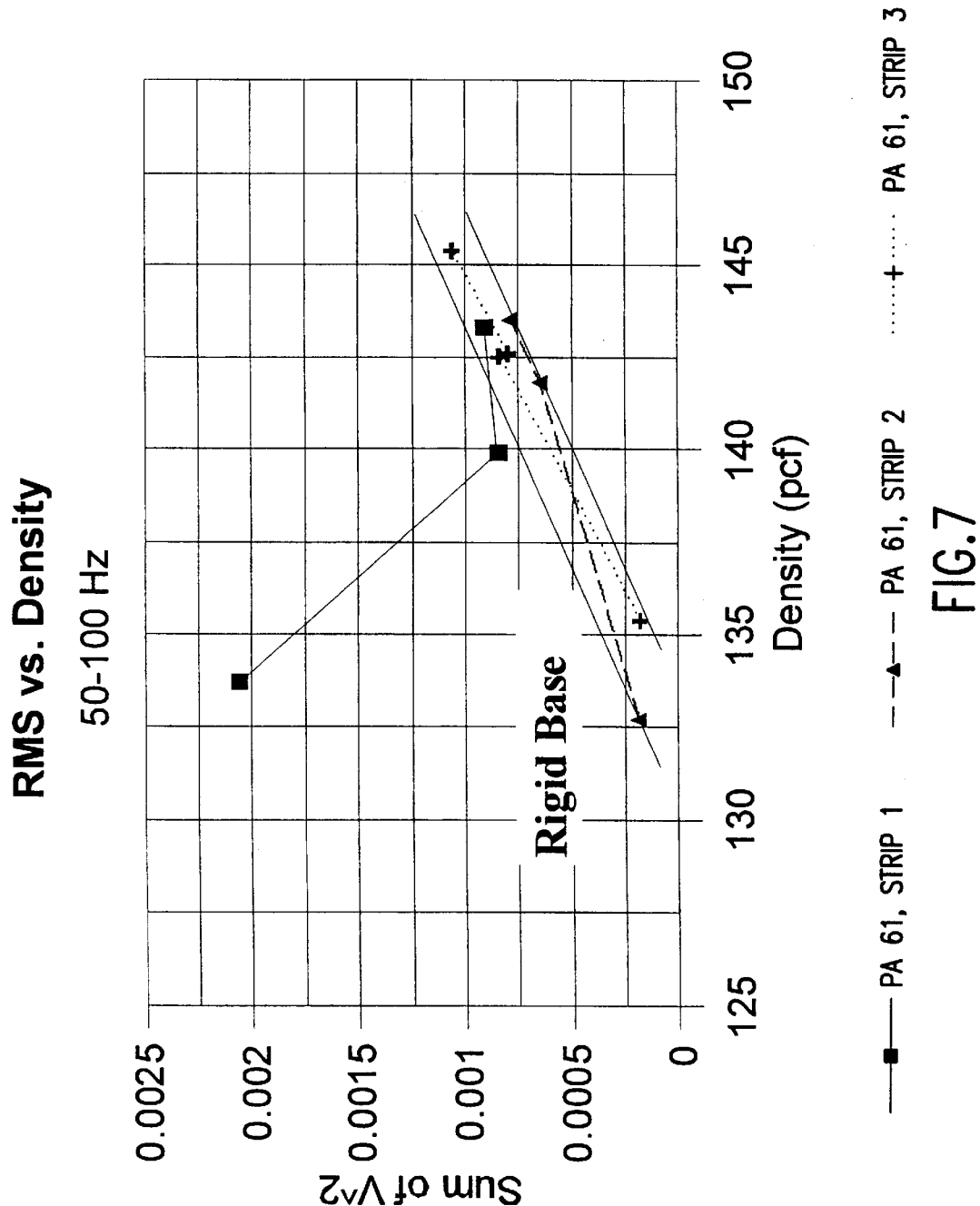
FIG. 7 is a power vs. density plot according to the present invention.
Figure 8:
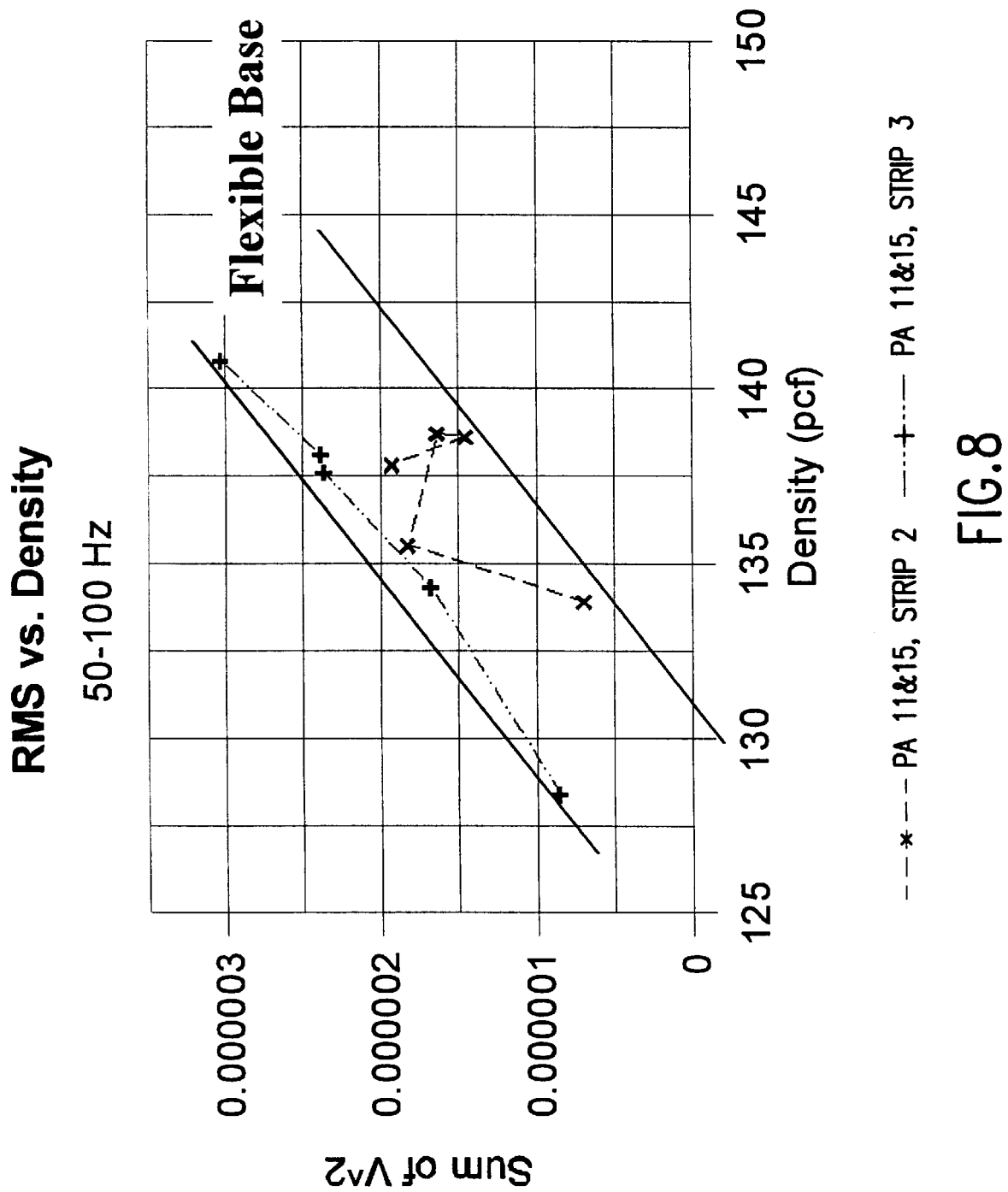
FIG. 8 is a power vs. density plot according to the present invention.

The next level of analysis involves the calculation of Root Mean Square (RMS) values. Various frequency zones were examined, and it was determined the best results were from the zones of 0–50 Hz, 50–100 Hz, and 100–150 Hz. Typical plots are shown in FIGS. 7 and 8 for the range of 50–100 Hz for the rigid and flexible base projects, respectively. For the flexible base pavement of FIG. 8, there is a noticeable increase in the sum of the $V^2$, and the bandwidth was about 7 pcf. For the rigid base pavement, the increase in the sum of the $V^2$ is equally noticeable although much less in magnitude and the band width is about 3 pcf.

Figure 9:
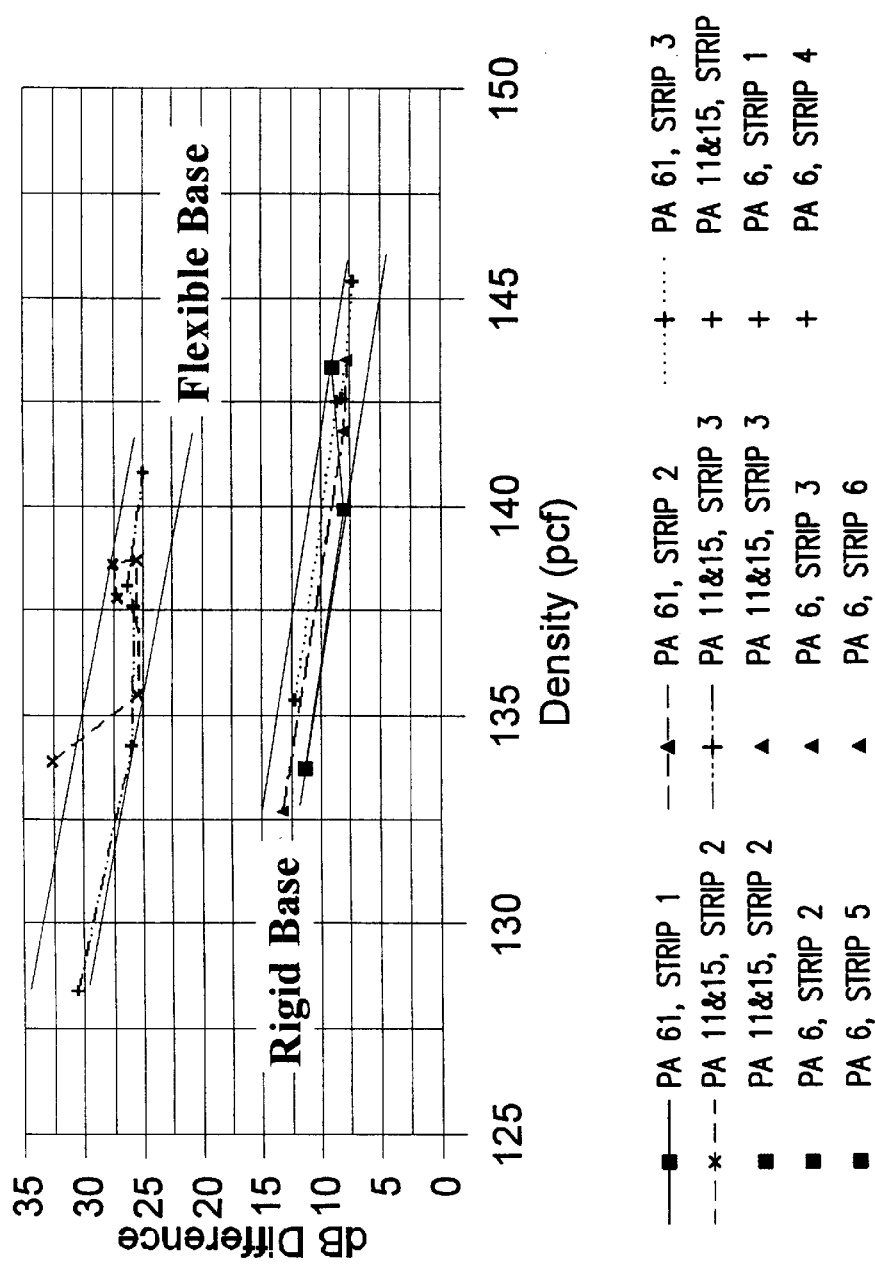
FIG. 9 is a difference vs. density plot of $2^{nd}$ harmonic to fundamental frequency according to the present invention.
Figure 10:
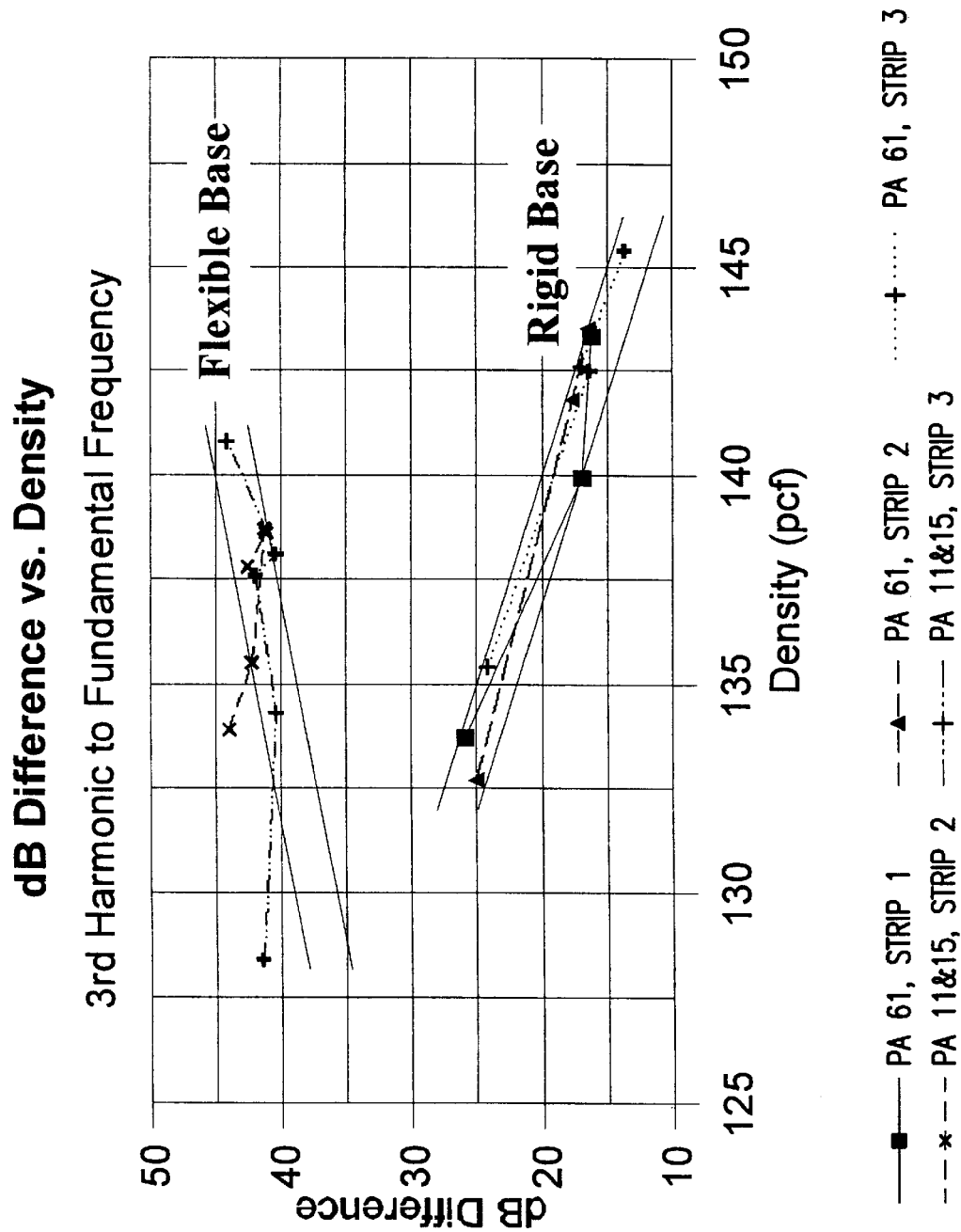
FIG. 10 is a difference vs. density plot of $3^{rd}$ harmonic to fundamental frequency according to the present invention.
Figure 11:
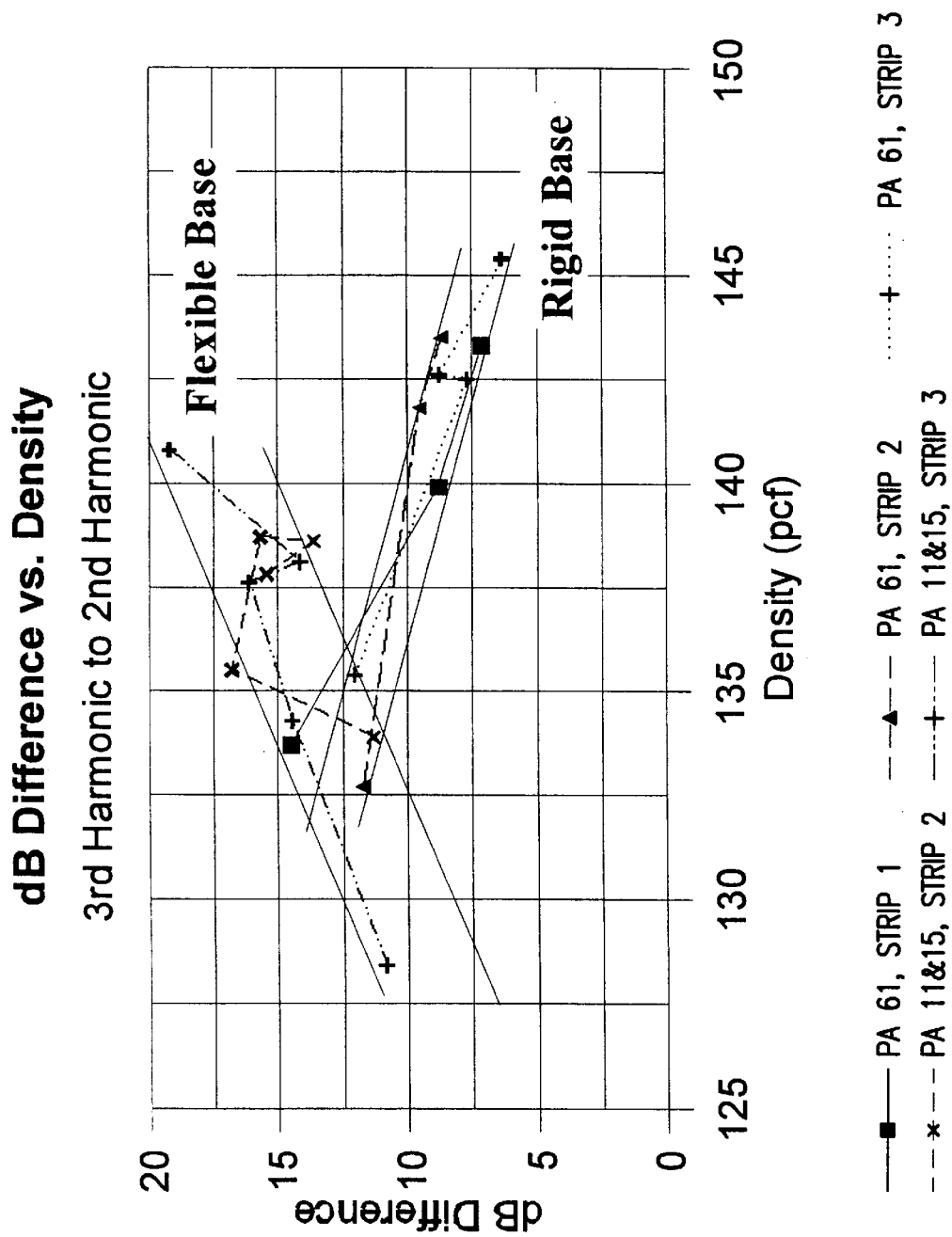
FIG. 11 is a difference vs. density plot of $3^{rd}$ harmonic to $2^{nd}$ harmonic frequency according to the present invention.

Finally, the dB difference as ratios for the 2nd harmonic to the fundamental, 3rd harmonic to the fundamental, and the 2nd harmonic to the 3rd harmonic were calculated. These ratios were plotted as shown in FIGS. 9–11. The 2nd harmonic to the fundamental frequency shows consistency between the two types of bases. The band width in FIG. 9 ranges from 6 to 8 pcf. The data in FIGS. 10 and 11 tend to show inconsistent trends as compared to FIG. 9. It is believed that more investigation must be made to determine if the plots shown in FIGS. 10 and 11 are useful. All the plots showed consistency between test strips on the same project.

Figure 12:
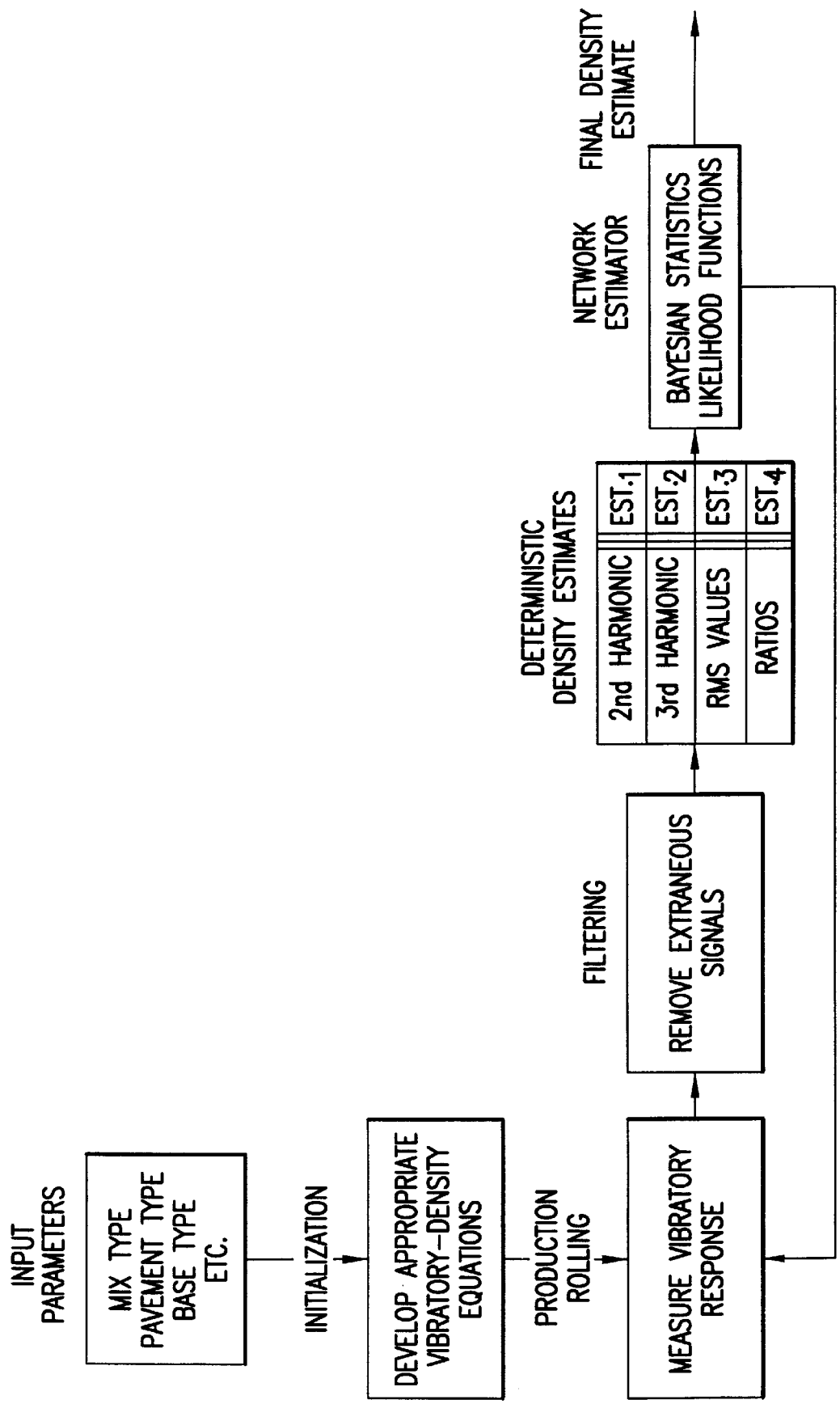
FIG. 12 is a schematic of a working system to determine density according to the present invention.

For a working system, an interpreter algorithm is required to select various regression model equations for the specific pavement compaction project., as shown schematically in FIG. 12. First, specific input parameters are needed for the project and are provided by the contractor or inspector. The input parameters include pavement type, mix type, base type, and various mix design parameters. Also, needed for the interpreter algorithm are specific vibratory response and density measurements for the specific project. The vibratory response and density are measured during the compacting of the test strips of a project. During the compaction of a test strip the vibratory response is usually measured by an accelerometer on the compactor equipment. Then, the density of the compacted material is measured where the vibratory response reading was taken. The density of the material is usually taken by a nuclear density gauge. These measurements are taken several times during compaction of the test strips to provide a useful database. The data measured from the test strips is entered along with the input parameters into a computer to determine the appropriate Vibratory-Density equations. A software package for linear multiple regression modeling such as Minitab can be used with the input parameters, vibratory response and density measurements to determine the project specific Vibratory-Density equations for the project. The project specific equations define the vibratory response-density relationship for that paving or compaction project. These project specific equations are then entered into a computer which is onboard the compactor and connected to a device to measure the vibratory response of the compactor during compaction. This device is typically an accelerometer as mention before, but could be any device capable of measuring the vibratory response of the compactor. The accelerometer and the onboard computer make up a real time compaction density meter to estimate the density of the material as it is compacted. p With the project specific Vibratory-Density equations as described above, density measurements of the compacted material can now be taken during compaction by the compaction density meter mounted on the compactor. The compactor's onboard computer receives the signals from the accelerometer. These signals are used in the project specific equations to estimate the density of the material during compaction. Because of various stray signals that may occur at random which are short-lived, a filtering scheme is utilized to eliminate them. One filtering scheme utilized is based on the random variability of the signal measured during the initialization phase in order to ignore stray or outlier signals. After filtering, multiple Deterministic Density Estimates are generated by the compactor's onboard computer using each project specific equation. There is one equation each for selected multiple frequencies, RMS values, and dB differences. It must be pointed out that the direction the compactor travels had an effect on the Vibratory-Density equations. It is believe this effect is due to the position of the accelerometer on the compactor. For the testing described above, the accelerometer was mounted on the frame of the compactor near the front drum. of the compactor. Different equations were produced by the Minitab software which depended on the direction of travel of the compactor. This effect of direction on the Vibratory-Density equations should be considered whenever deriving the Vibratory-Density equations.

A final density estimate must be determined from the multiple Deterministic Density Estimates. As shown in FIG. 12, a Network Estimator is used to provide the final density estimate. FIG. 12 also shows that individual Deterministic Density estimates are generated from the vibratory relationships, i.e. harmonics, RMS values, dB differences, etc. Associated with each of the individual Deterministic Density estimates is a unique bandwidth and likelihood of being within the limits, that is, an accuracy and frequency with which the accuracy can be achieved. For example, typical estimates are within ±2 pounds per cubic foot (pcf), 85% of the time. Each relationship can be developed into a likelihood function. The individual deterministic estimates are then be integrated into an overall estimate using such techniques as Bayesian statistics. The overall estimate is reported to the user and the system continues to compute new estimates in real time as the compactor continues rolling. As will be described further, using the GIS system of the second component of the present invention, the specific location of the density measurement can be determined and preserved to compute a density map of the area compacted.

The second component provides a Geographic Information System (GIS) for tracking compaction of a surface. More specifically, the invention relates to a system for tracking compaction of a surface by use of a Global Positioning System (GPS) receiver and recording such information as a function of position to determine coverage by the moving compaction equipment. FIG. 1 shows an example of the implementation of the proposed system. A positioning device is placed on the compactor. This device records positioning information and using an appropriate wireless technology, can transmit this information to a remote computer.

Figure 13:
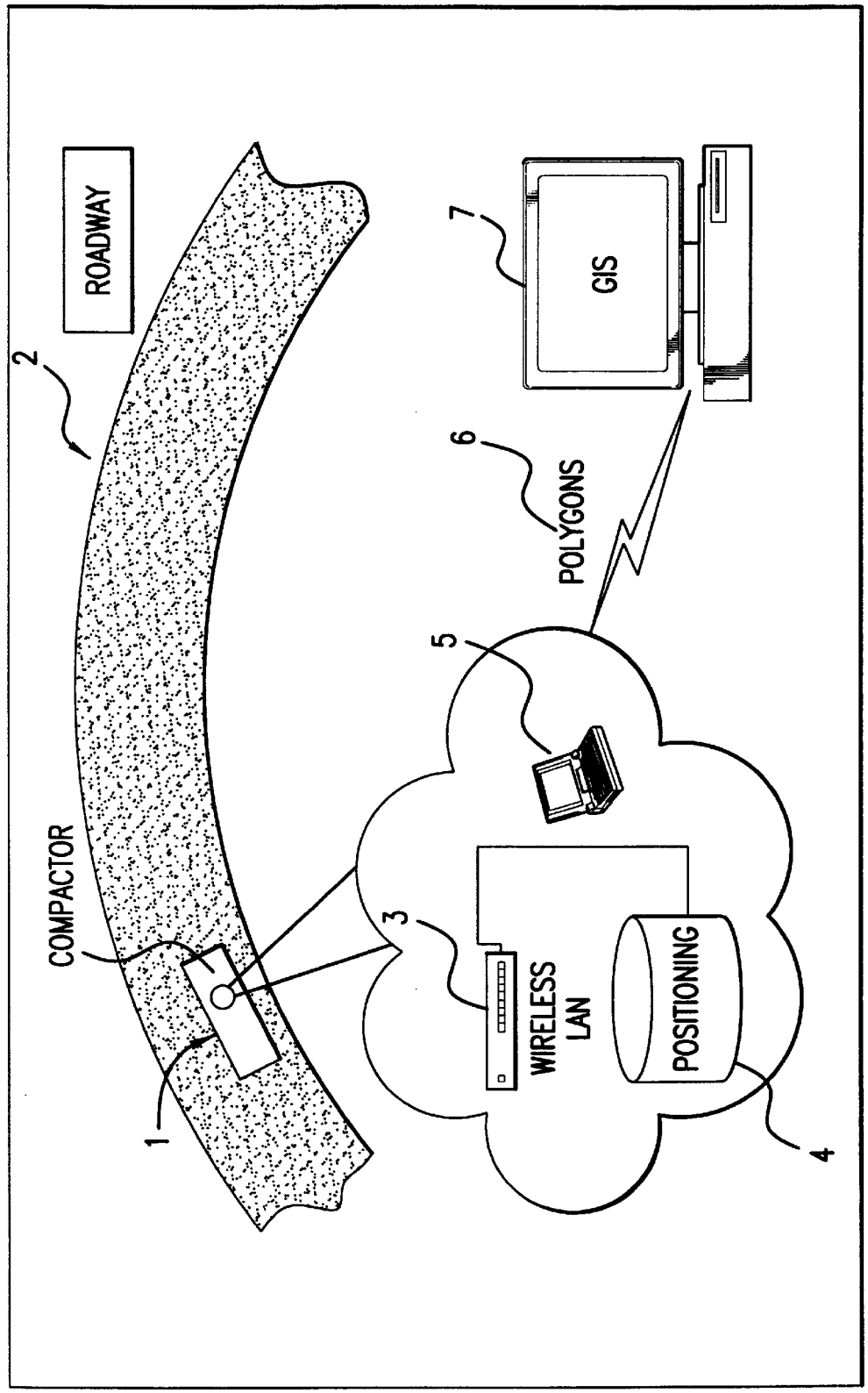
FIG. 13 is a diagram of the system or method of the present invention showing one embodiment of the invention.
Figure 14:
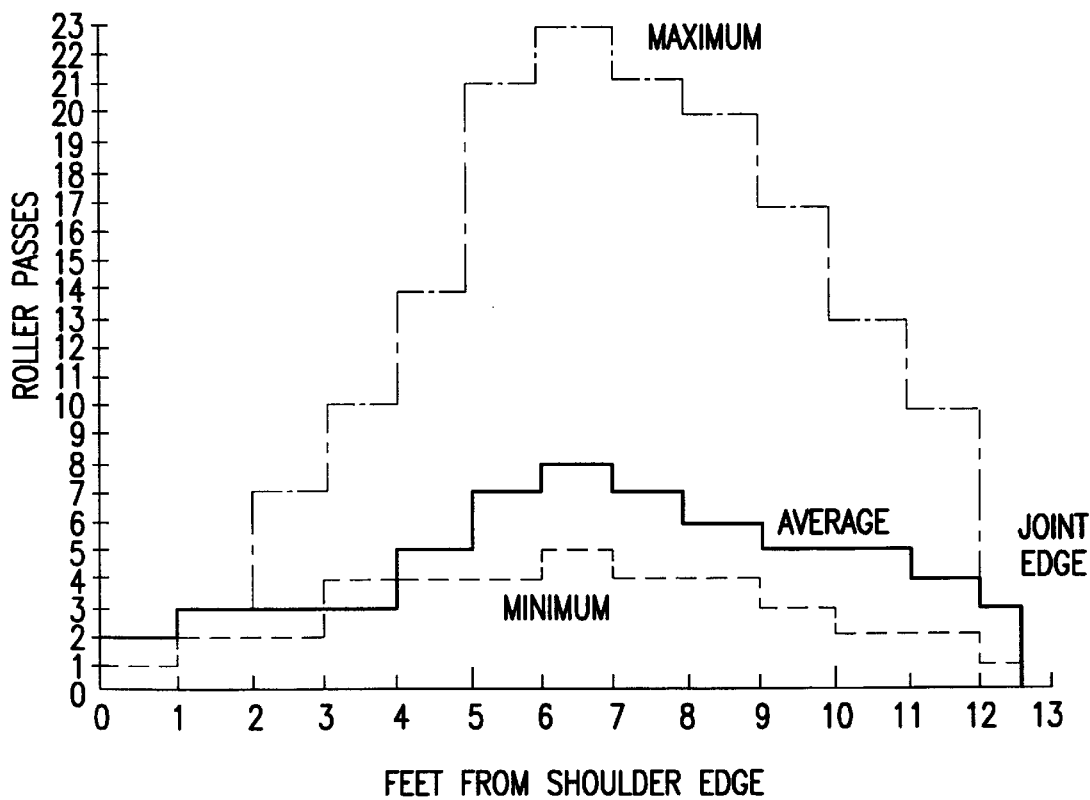
FIG. 14 shows the results in a variation in compaction of roller passes in 20 test sections.

FIG. 13 shows an example of the geographic information system for tracking compaction. The compactor 1 travels on roadway 2. The compactor contains a wireless transmitter 3 and positioning device 4 with computer 5. The positioning device 4 functions as a receiver with a Global Positioning Satellite, not shown, for determining the location of the compactor 1. The positioning device 4 or satellite receiver receives a plurality of signals enabling it to determine positioning information. Polygons 6 are used in a topological overlay for and in the positioning of the compactor 1. A GIS 7 is a computer system able to store and display the positioning information transmitted from the transmitter, including descriptive data to depict the number of passes or coverages within a compaction area on roadway 2.

Figure 15:
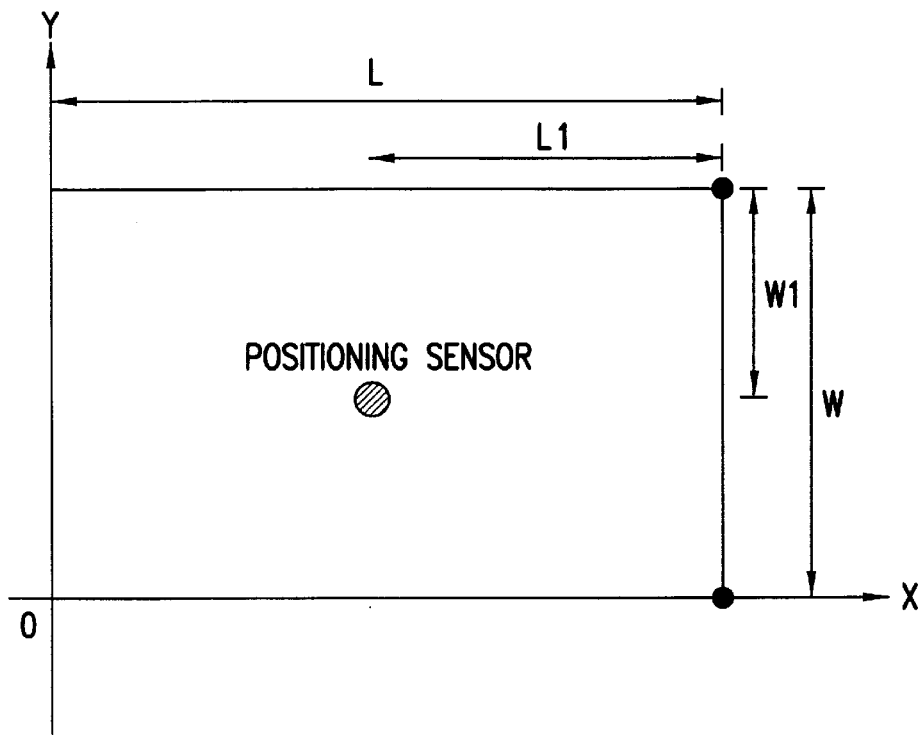
FIG. 15 shows coordinate information in one embodiment of the present invention.
Figure 16:
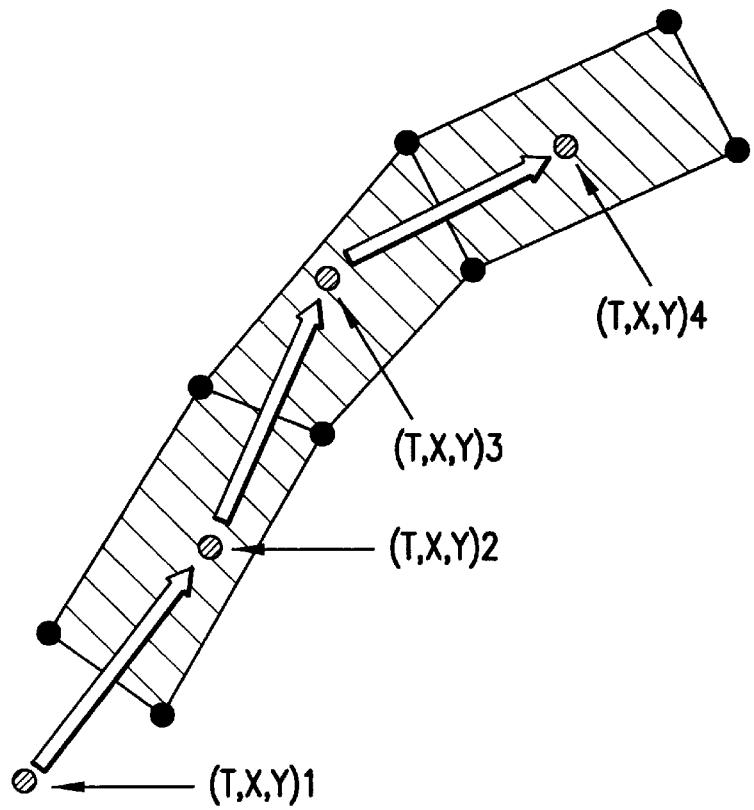
FIG. 16 shows a path of a compactor in accordance with the present invention.

Referring to FIG. 15, compactor geometry and axes are shown. The compacted area for each pass over the roadway 2 or surface is determined by the compactor drum width and wheel base length. By means of continuously connecting the front edge of the compactor 1, the closed polygon depicts the compacted area during this elapsed time as shown in FIG. 16. In this regard, a time-based simulated position file depicting the location of the positioning device can be obtained with the known compactor rolling pattern, perimeters for drum width, wheel base, and compactor.

$$\theta = \tan^{-1}\left(\frac{Y_2 - Y_1}{X_2 - X_1}\right)$$

One of the first steps in order to track the compactor pass, the front edge position of the compactor at each time of pass is evaluated. This is shown as FIG. 17. Assuming that the compactor starts by moving forward, the moving orientation can be determined by observing the two consecutive time movements. The angle of the moving direction is defined as $\theta$, which is the angle between two consecutive positions and the X-axis, measured in a counterclockwise direction.

To obtain the front edge point of compactor 1, calculations must include the compactor displacement and rotation as outlined in FIG. 5.

Figure 18:
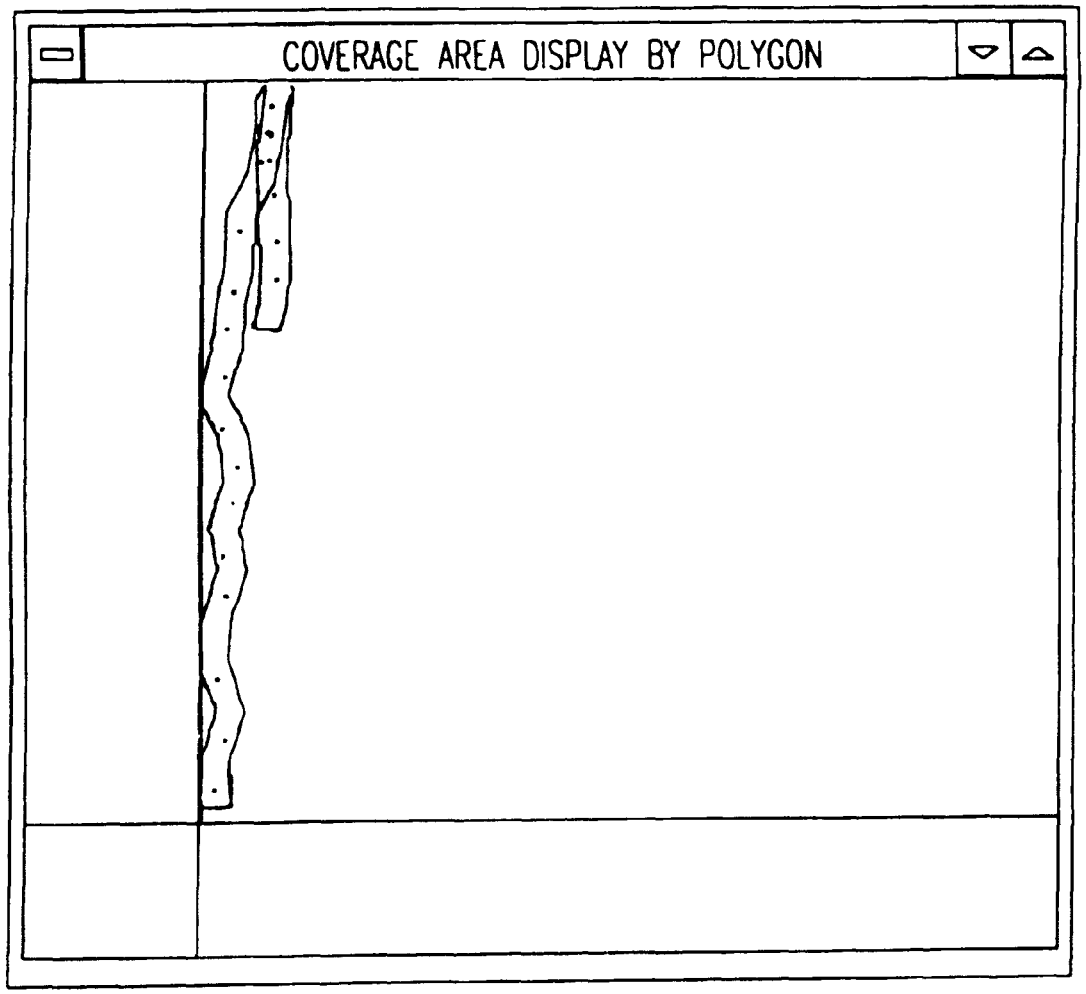
FIG. 18 shows a list of polygons of the present invention without termination.

As shown in FIGS. 16 and 18, the front edge positions are calculated and $$(X_{11}\ Y_{11}) = (X_1\ Y_1) + (L_1\ W_1)\begin{pmatrix}\cos\theta & \sin\theta\\ -\sin\theta & \cos\theta\end{pmatrix}$$

$$(X_{12}\ Y_{12}) = (X_1\ Y_1) + (L_1\ (W_1 - W))\begin{pmatrix}\cos\theta & \sin\theta\\ -\sin\theta & \cos\theta\end{pmatrix}$$

connected together to form a continuous polygon. The rear edge of the compactor 1 is ignored. By ignoring the rear edge, a negligible error at both the starting and finished position of each pass is introduced into the system.

Figure 17:
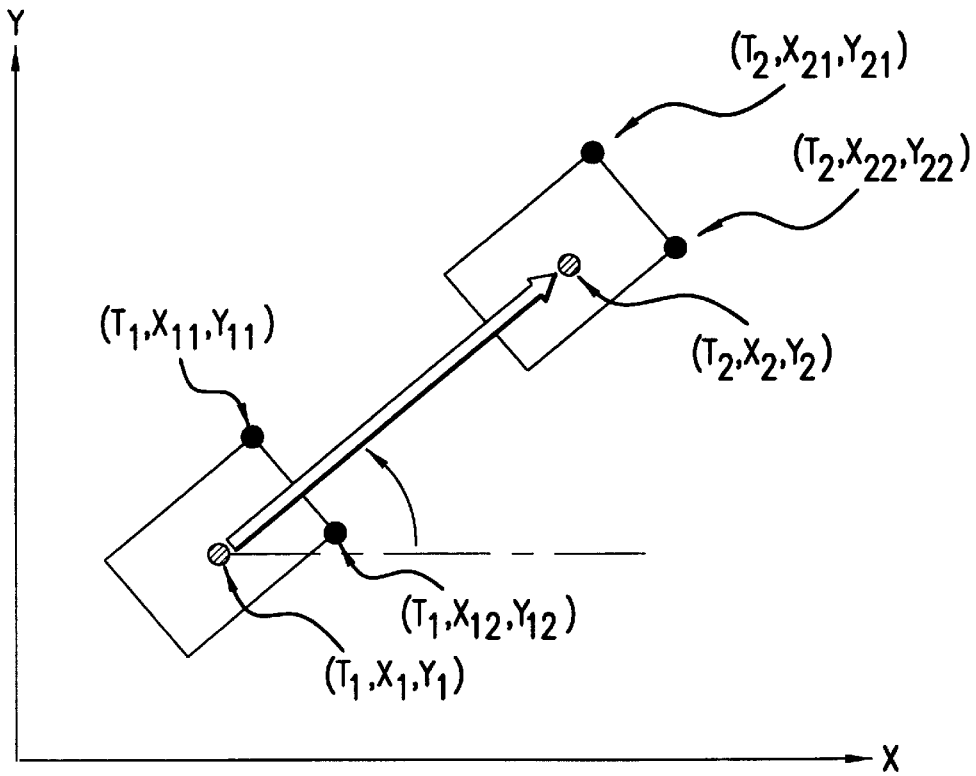
FIG. 17 shows the results of measuring the front edge determination of a strip of pavement in accordance with the present invention.

In order to determine if the compactor 1 is turning back or changing direction significantly, the polygons 6 are terminated within in the compaction area. If the compactor 1 passes over the same area, the number of passes over the region should increase, which is unnecessary. Therefore, the polygons must be terminated within the compaction area as seen in FIGS. 16, 17 and 18.

Figure 19:
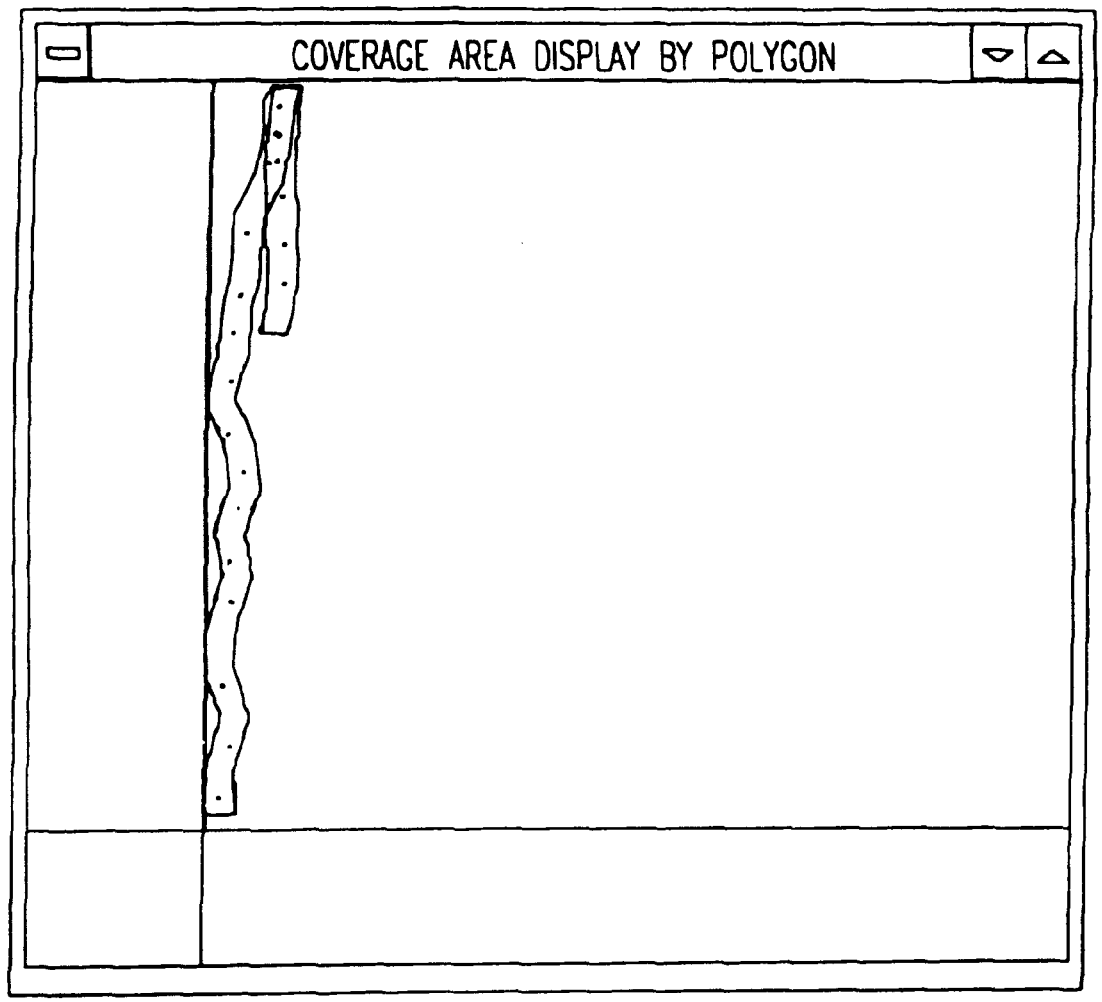
FIG. 19 shows a list of polygons of the present invention with termination.
Figure 20:
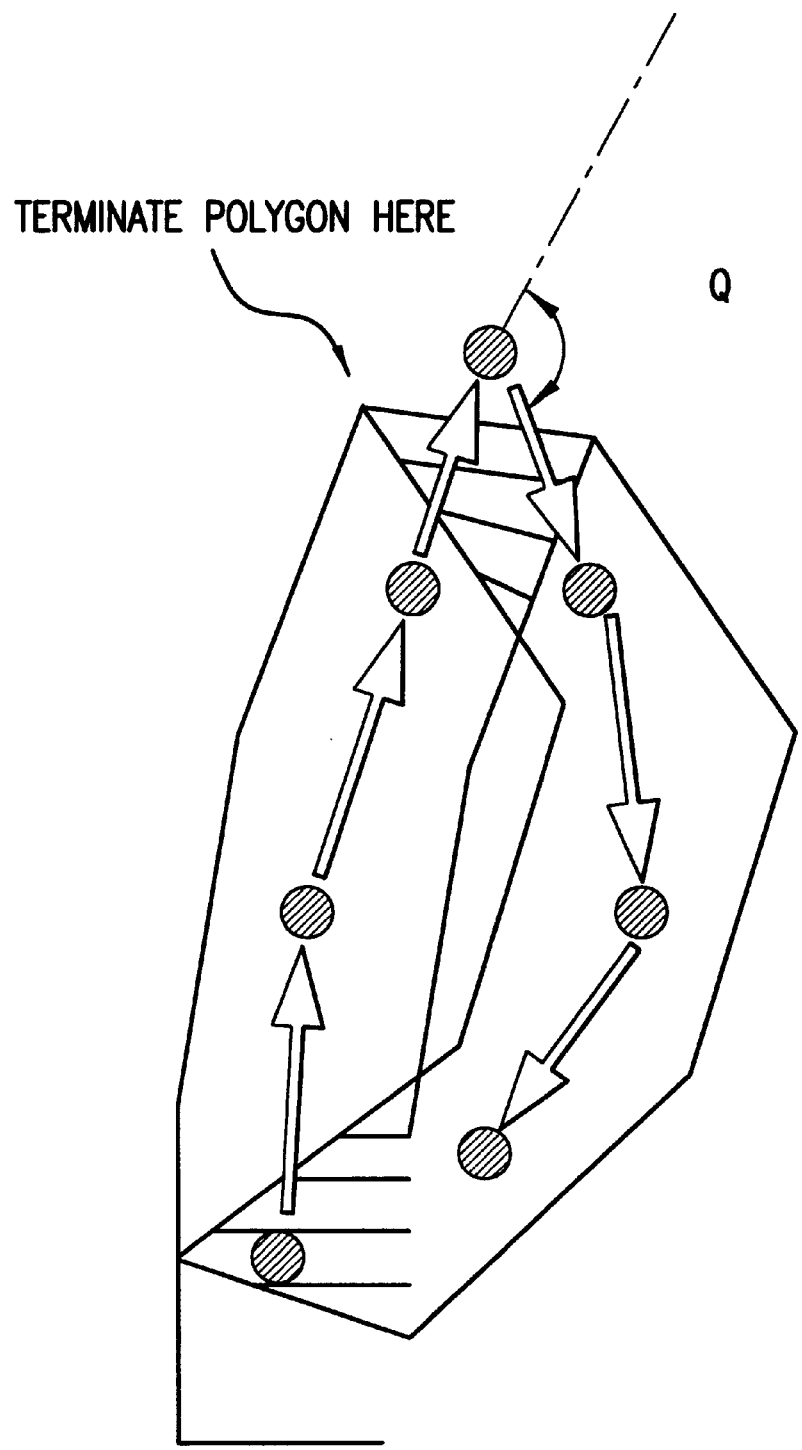
FIG. 20 shows a schematic drawing of a compactor making a 90 degree turn.

FIG. 18 shows that if a termination point of the polygon is not determined, the number of passes in the whole area within the polygon will be considered as just one when it should be two. For this reason, the coverage polygon must be terminated as shown in FIG. 19. Algorithm has developed to determine when the coverage polygon should be terminated and is described on the following situation:

1. If the compactor makes a turn greater than or equal to 90°, then the polygon is terminated (FIG. 20).

Figure 21:
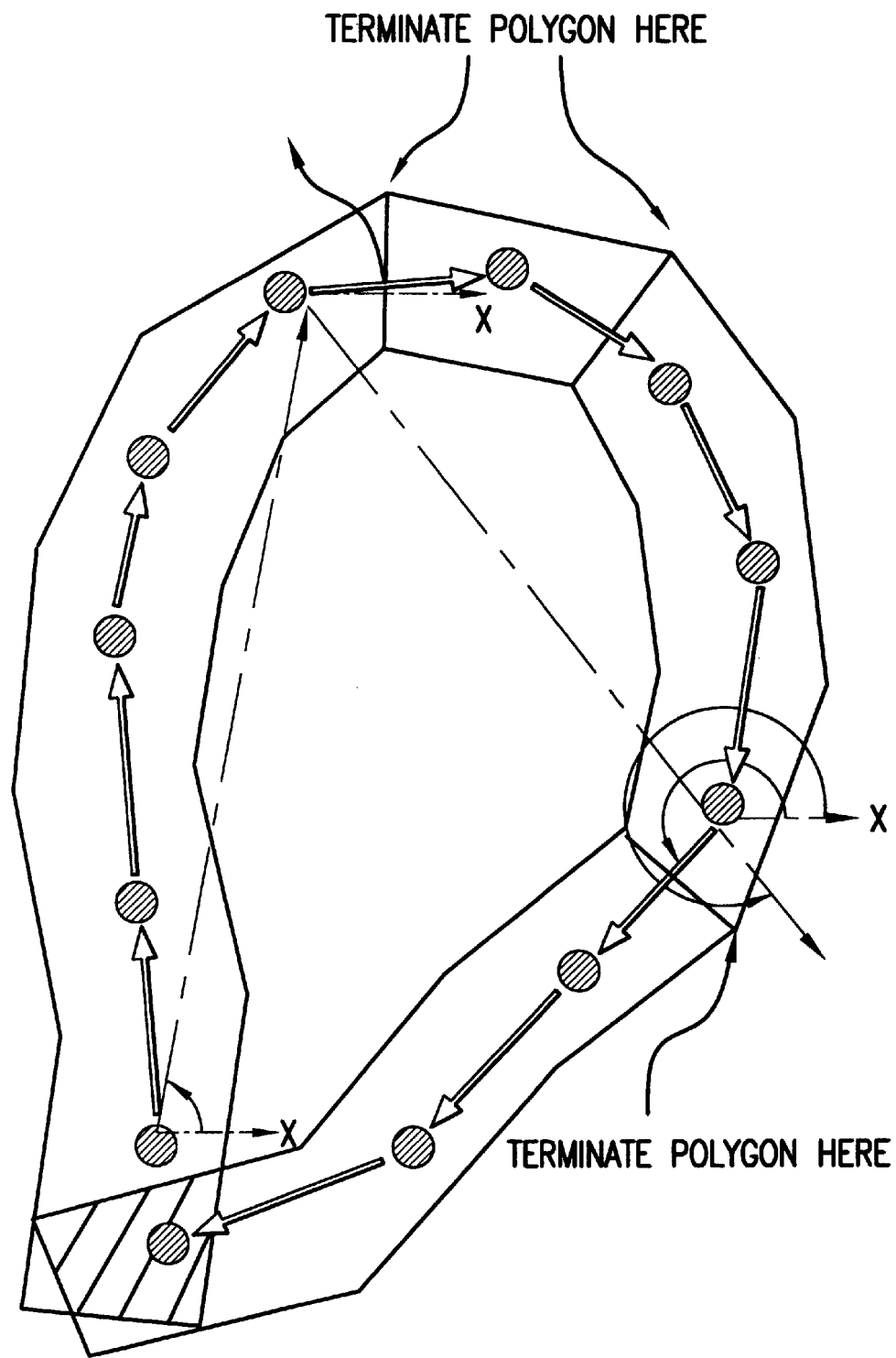
FIG. 21 shows a schematic drawing of a compactor making a shallow turn.

2. The second possibility occurs when the compactor changes its direction gradually thus the same area may be passed again (FIG. 21). In this case, to terminate the polygon, the direction vector of the compactor, i.e., the angle $\theta$ between moving direction and X-axis is calculated for each move. If the absolute value of this angle exceeds the average of the preceding direction vectors by a user-specified amount, then the polygon is terminated. Polygons must be processed to determine the number of passes over each point at this stage of the system for it has a number of overlapping polygons.

The GIS 7 is a computer system able to store and display the descriptive data, that is, the number of passes within the compaction area of a road strip. Refer to Oloufa, A. A., Papacostas, C. S. and Hainada, H.: "Relating Structural Failures to Subsurface Conditions Using GIS". Building and Environment Journal, Vol. 27, No. 2, April, 1992; Oloufa, A. A., Papacostas C. S. and Espino, R.: "Construction Applications of Relational Databases in Three Dimensional GIS", ASCE Journal of Computing. January, 1992 and Oloufa, A. A., Eltahan, A. and Papacostas, C. S.; "An Integrated GIS for Construction Site Investigation". ASCE Journal of Construction Engineering and Management, March, 1994 for more information on GIS applications.

Spatial data and attribute data are two components of geographic data. The spatial data is used to define graphical objects in space such as points, lines and areas. The attribute data is used to store a description of the graphical objects. Examples of spatial data include: 1) points or zero dimensional objects in a set of coordinates, which can be used to represent the location of a lamp post, etc.; 2) lines or one dimensional objects in a set of coordinates, which can be used to depict a river, a utility network, or a street of a map; and 3) areas or two dimensional objects in a set of coordinates, which can be used to represent the location of parcels or lakes. In accordance with the present invention, the coverage areas are best represented using polygons.

Figure 22:
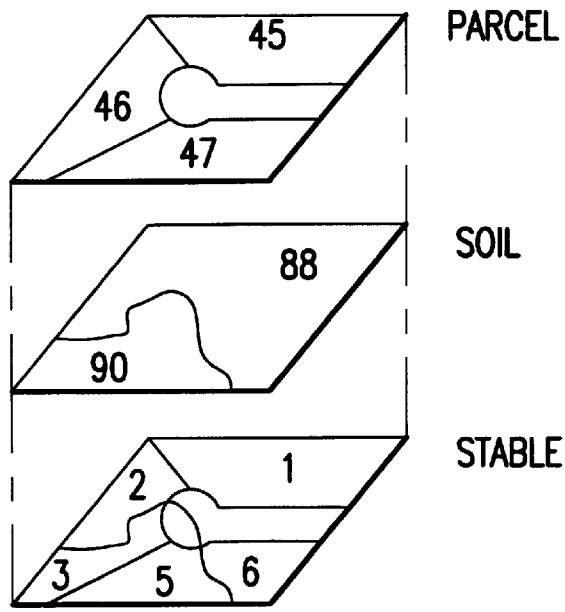
FIG. 22 shows a schematic of a topological overlay of GIS of the presentation invention.

Different types of spatial objects can be displayed separately in multiple coverages. For example, a certain area of soil types may be shown in coverage, whereas parcels are shown in another. For example, FIG. 22 shows the results of topological overlay pertaining to sets of polygons. If one wants to know the soil condition in a particular parcel, one can use a topological overlay joining polygons from two coverages to establish the spatial relationship between parcels and soil types, as shown in FIG. 22.

Figure 23:
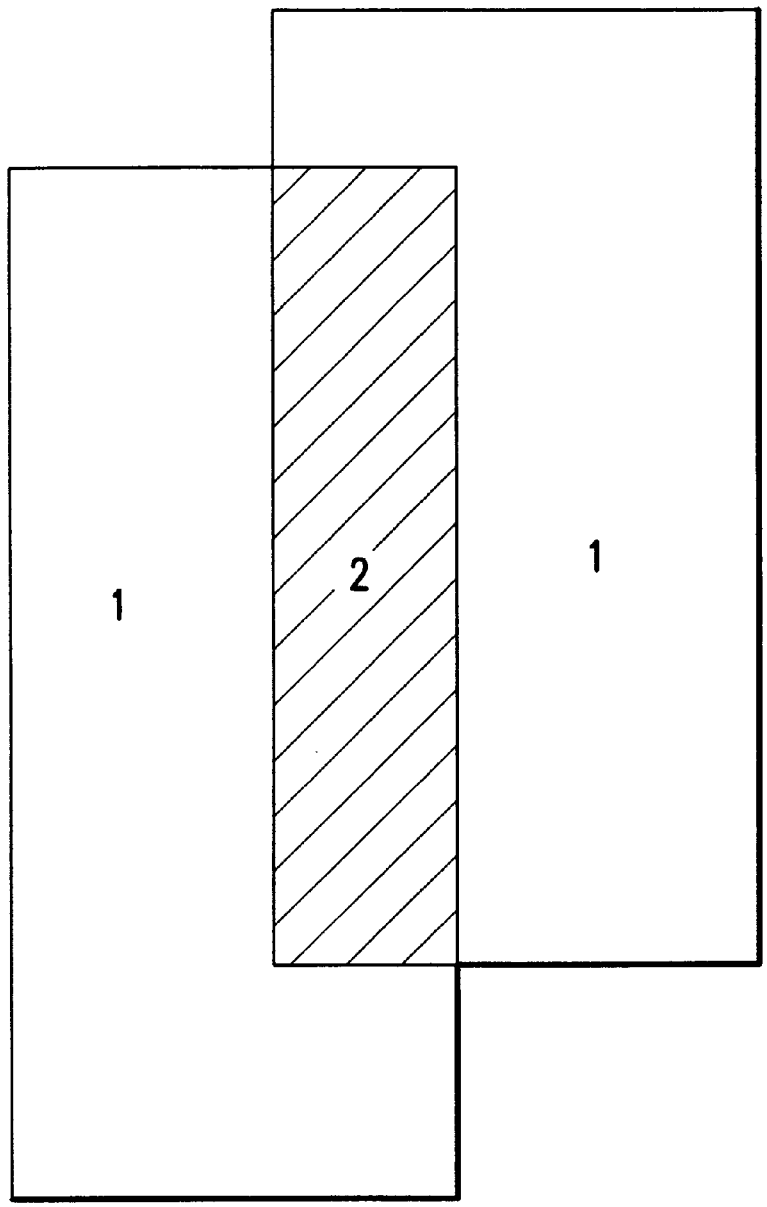
FIG. 23 shows a schematic drawing of the intersection and union of polygons.

FIG. 23 from ESRI: Understanding GIS, the ARC/INFOR Way" Redlands, Calif. 1992 shows a simple illustration of an overlay technique. The inner section area which is shaded is between the two polygons. This area has two passes. The remaining area, which is non-shaded or blank is the union area.

In accordance with the present invention, each polygon has an identification number. By using the GIS overlay technique, the number of passes within the compaction area can be obtained.

The following represents the operation of the GIS for tracking compaction of the surface of the present invention. A sample roadway is selected, and simulated data for a potential compaction scenario is developed. This data is then processed by a program that creates a coverage polygons and using a user specified angle terminated the polygons. The next step is development of a topological overlay whose output is the actual number of passes done by the compactor over the roadway.

Figure 24:
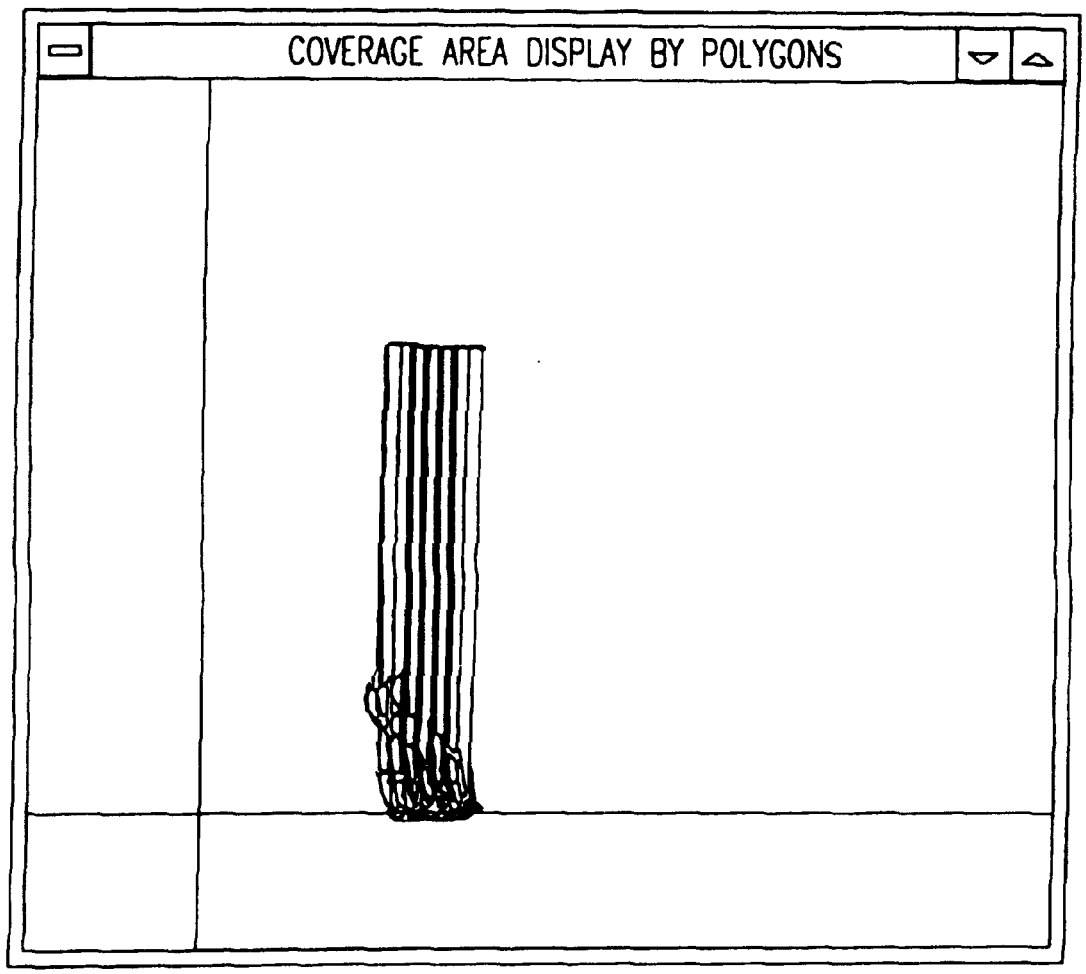
FIG. 24 shows a schematic drawing of the example of the present invention.

The developed program is attached to the patent application as Appendix 1. It is used to process the simulated data position information. As seen in FIG. 24, there are 15 polygons and each polygon is saved in a DXF file. Each DXF file is imported into IDRISI and saved in a vector file. IDRISI is a raster-based GIS program that runs on an IBM compatible computer. In this sample, the following perimeters are used L1=1.57 m, W1=0.85 m, delta-angle=30°.

Figure 25:
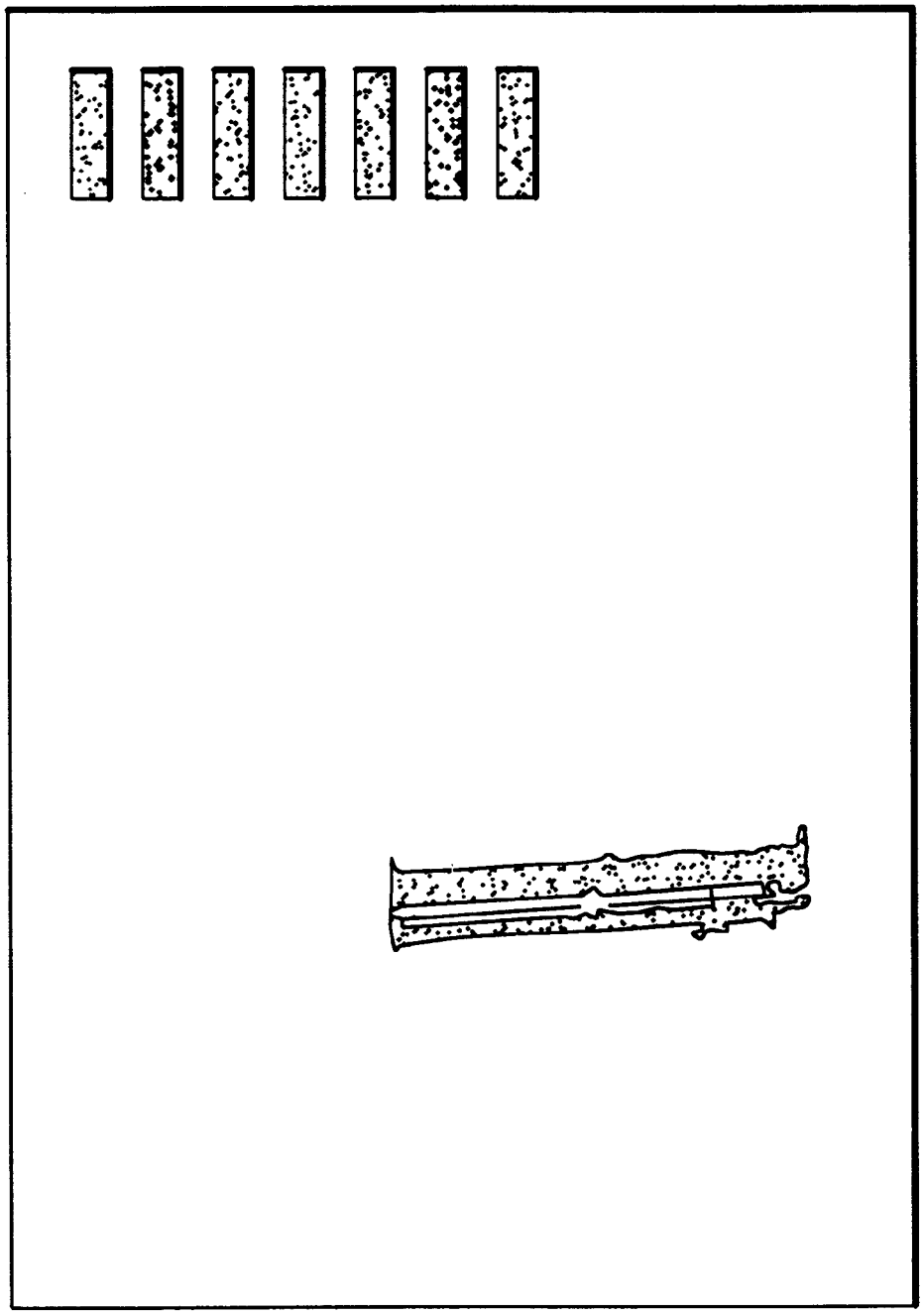
FIG. 25 shows the results of the test performed in the example of the present invention.

Next, the 25 vector files are converted to a raster representation for manipulation by IDRISI software. Next, the 15 image files are overlayed. FIG. 25 shows the final image. By comparing the color within the compacted area with color categories in the right side of the screen, users can easily identify the number of passes in each compacted area. Also, users can query the number of passes at any location by moving the mouse on the computer. The query result will show the location of value of x-y coordinates and the Z value representing the number of passes. The results can be used both for real time information relayed to the compactor operator and as a historical record.

Quite simply, the method of monitoring the process of a compactor compacting a surface involves identifying the initial position of the compactor with respect to the surface, monitoring the movement of the compactor over the surface, digitally recording the movement of the compactor over the surface and calculating the compaction of the surface based upon the initial position of compactor and the digitally recorded movement of the compactor over the surface.

In the foregoing specification, the present invention has been described with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

We claim:

1. A compaction density meter comprising:
   an input device which inputs at least one parameter signal representing a characteristic of a surface to be compacted;
   a measuring device which generates at least one vibration signal representing a vibratory response produced by vibration during compaction; and
   a computer system which determines density of the compacted surface in response to the at least one parameter signal and the at least one vibration.

2. The compaction density meter of claim 1, wherein the characteristic for the parameter signal comprises pavement type, mix type, base types or site condition.

3. The compaction density meter of claim 1, further comprising a geographic information system for tracking a geographical position of the compaction density meter during compaction of the surface.

4. The compaction density meter of claim 3, wherein the surface is selected from the group consisting of pavement, asphalt, roller compacted concrete, earth, earthen embankments, landfills and other compacted surfaces.

5. The compaction density meter of claim 3, wherein the compaction of the surface is tracked on the basis of position and number of coverages.

6. The compaction density meter of claim 3, wherein the geographic information system records the geographical position during compaction.

7. A method of measuring density of a compacted material during compaction, comprising the steps of inputting characteristic parameters of compaction equipment and material to be compacted;
   obtaining vibratory response data of the compaction equipment and density measurements of the material to be compacted which are measured during compaction test strips of the material by the compaction equipment; and
   determining the density of the compacted material in response to the input characteristic parameters, the vibratory response data, and the density measurements.

8. The method of claim 7, wherein the characteristic parameters include pavement type, mix type, base type, site conditions and various mix design parameters.

9. The method of claim 7, wherein the vibratory response is measured by an accelerometer.

10. The method of claim 7, wherein the density of the material is measured by a nuclear density gauge.

11. The method of claim 7, wherein vibratory response and density measurements are taken several times during compaction of the test strips to provide a useful database.

12. The method of claim 7, further including the step of using a filtering scheme to eliminate possible stray signals from measurement equipment that measures the vibratory response of the compaction equipment.

13. The method of claim 7, further comprising the step of reporting the density of the compacted material and continuing to measure in real time the density of material as the compactor continues compacting.

14. The method of claim 7, further comprising the step of recording each density value calculated and a position of the compacted material where the density value was taken.

15. The method of claim 14, further including the steps of:
   a) identifying an initial position of the compactor with respect to the surface;
   b) monitoring movement of the compactor over the surface;
   c) digitally recording the movement of the compactor over the surface; and
   d) calculating the compaction of the surface based upon the initial position of the compactor and its geometric properties and the digitally recorded movement of the compactor over the surface.

16. The method of claim 14, further including the steps of:
   a) identifying an initial position of the compactor with respect to the surface;
   b) monitoring each movement of the compactor over the surface;
   c) creating a polygonal representation corresponding to each said movement of the compactor over the surface;
   d) developing a topological overlay which combines each said polygonal representation;
   e) identifying each intersection and each union of said polygonal representations within said topical overlay; and
   f) calculating the compaction of said various portions of the surface based upon each said intersection and each said union in topological overlay.

17. The method of claim 7, wherein the developed equations are derived using a software package for linear multiple regression modeling.

18. The method of claim 7, wherein the developed equations are entered into a computer which is onboard the compactor and wherein the computer is connected to a device to measure the vibratory response of the compactor during compaction.

19. The method of claim 7, further comprising the step of developing a relationship of a likelihood function to select a final density value from values determined from the developed equations.

20. The method of claim 19, wherein the likelihood function is a technique known as Bayesian statistics.

21. A compactor comprising:

a compaction apparatus for compacting a surface;

an input device which inputs at least one parameter signal representing a characteristic of a surface to be compacted;

a measuring device which generates at least one vibration signal representing a vibratory response produced by vibration during compaction by the compaction apparatus; and a computer system which determines density of the compacted surface in response to the at least one parameter signal and the at least one vibration signal.

22. The compactor as set forth in claim 21, wherein the characteristic comprises pavement type, mix type, base type, or site condition.

23. The compactor as set forth in claim 21 further comprising a geographic information system for tracking a geographical position of the compaction density meter during compaction of the surface.

* * * * *